(12) United States Patent
Rahman et al.

(10) Patent No.: US 10,985,959 B2
(45) Date of Patent: Apr. 20, 2021

(54) ADAPTING UE ON/OFF TRANSIENT TIME PARAMETER FOR DIFFERENT TRANSMISSION TIME INTERVAL PATTERNS

(71) Applicant: Telefonaktiebolaget LM Ericsson (publ), Stockholm (SE)

(72) Inventors: Imadur Rahman, Sollentuna (SE); Dominique Everaere, Åkersberga (SE); Laetitia Falconetti, Järfälla (SE); Muhammad Kazmi, Sundbyberg (SE); Mårten Sundberg, Årsta (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/482,939

(22) PCT Filed: Dec. 28, 2017

(86) PCT No.: PCT/SE2017/051354
§ 371 (c)(1),
(2) Date: Aug. 1, 2019

(87) PCT Pub. No.: WO2018/143856
PCT Pub. Date: Aug. 9, 2018

(65) Prior Publication Data
US 2020/0007370 A1 Jan. 2, 2020

Related U.S. Application Data

(60) Provisional application No. 62/455,435, filed on Feb. 6, 2017.

(51) Int. Cl.
*H04L 27/26* (2006.01)
*H04L 5/00* (2006.01)

(52) U.S. Cl.
CPC ........ *H04L 27/2613* (2013.01); *H04L 5/0048* (2013.01)

(58) Field of Classification Search
CPC .. H04L 27/2613; H04L 5/0048; H04L 5/0007
See application file for complete search history.

(56) References Cited

U.S. PATENT DOCUMENTS

| | | | |
|---|---|---|---|
| 2007/0064665 A1* | 3/2007 | Zhang | H04L 5/0044 370/343 |
| 2017/0325246 A1* | 11/2017 | Agarwal | H04W 72/1215 |
| 2019/0223204 A1* | 7/2019 | Kim | H04B 1/00 |

FOREIGN PATENT DOCUMENTS

JP WO2016133123 A1 11/2017

OTHER PUBLICATIONS

3GPP TSG-RAN WG1 #86 bis; Lisbon, Portugal; Source: Ericsson; Title: UL power-related aspects for sTTI (R1-1610337)—Oct. 10-14, 2016.

(Continued)

*Primary Examiner* — Thai Nguyen
(74) *Attorney, Agent, or Firm* — Christopher & Weisberg. P.A.

(57) ABSTRACT

A wireless device (810) obtains (904) a first transmission time interval (TTI) for transmitting a first signal, and determines (908), based on the first TTI, a first transient time associated with the first TTI that defines a first duration during which a transmit power level of the wireless device changes. The wireless device transmits (912) the first signal using the first transient time. The wireless device obtains (916) a second TTI for transmitting a second signal, wherein a length of the second TTI is different from a length of the first TTI. The wireless device determines (920), based on the second TTI, a second transient time associated with the second TTI that defines a second duration during which the transmit power level of the wireless device changes that is (Continued)

different from the first transient time. The wireless device transmits (924) the second signal using the second transient time.

23 Claims, 15 Drawing Sheets

(56) References Cited

OTHER PUBLICATIONS

3GPP TSG RAN WG1 Meeting #86bis; Lisbon, Portugal; Source: CATT; Title: Discussion on UL sTTI operation (R1-1608749)—Oct. 10-14, 2016.
3GPP TSG-RAN WG4 Meeting #83; Hangzhou, China; Source: Ericsson; Title: UE reporting supported transient time parameters (R4-1704841)—May 15-19, 2017
3GPP TSG-RAN WG4 #81; Reno, Nevada; Source: Ericsson; Title: Implication of sTTI operation on UL on/off time mask (R4-1610472)—Nov. 14-18, 2016.
3GPP TSG-RAN WG4 Meeting #83; Berlin, Germany; Title: LS to RAN2 on UE reporting its supported transient time parameters (R4-1707653)—Aug. 21-25, 2017.
PCT International Search Report for International application No. PCT/SE2017/051354—dated May 2, 2018.
PCT Written Opinion of the International Searching Authority for International application No. PCT/SE2017/051354—dated May 2, 2018.
3GPP TSG RAN WG1 Meeting #86bis; Lisbon, Portugal; Source: Panasonic; Title: Discussion on reference signal design for shortened TTI (R1-1609572) —Oct. 10-14, 2016.
3GPP TSG-RAN WG4#82 Meeting; Athens, Greece; Source: ZTE Corporation; Title: Further discussion on UL on/off time mask for shortened TTI (R4-1700445)—Feb. 13-17, 2017.
European Search Report Communication, European Patent Office, Application No. / Patent No. 17895193.5—1205 / 3577966—PCT/SE2017051354, Form 1507S 06.12—dated Nov. 9, 2020.
Supplementary European Search Report, European Patent Office, Application No. EP 17 89 5193, EPO Form 1503 03.82 (P04C04)—dated Nov. 9, 2020.
European Search Opinion, European Patent Office, Application No. 17 895 193.5, CF Form 1507—dated Nov. 9, 2020.
Information on Search Strategy, European Patent Office, EP Application No. 17 89 5193, EPO Form P04A42, Nov. 9, 2020.

\* cited by examiner

FIGURE 5

ADAPTING UE ON/OFF TRANSIENT TIME PARAMETER FOR DIFFERENT TRANSMISSION TIME INTERVAL PATTERNS

PRIORITY

This nonprovisional application is a U.S. National Stage Filing under 35 U.S.C. § 371 of International Patent Application Serial No. PCT/SE2017/051354 filed Dec. 25, 2017 and entitled "Adapting UE On/Off Transient Time Parameter for Different Transmission Time Interval Patterns" which claims priority to U.S. Provisional Patent Application No. 62/455,435 filed Feb. 6, 2017 both of which are hereby incorporated by reference in their entirety.

TECHNICAL FIELD

The present disclosure relates, in general, to wireless communications and, more particularly, to adapting user equipment (UE) on/off transient time parameters for different transmission time interval (TTI) patterns.

BACKGROUND

Long Term Evolution (LTE) uses Orthogonal Frequency Division Multiplexing (OFDM) in the downlink (DL) and Discrete Fourier Transform (DFT)-spread OFDM in the uplink (UL).

FIG. 1 illustrates an example of the LTE time-domain structure. In the time domain, LTE DL transmissions are organized into radio frames (such as radio frame 10) of 10 milliseconds (ms). Each radio frame 10 consists of ten equally-sized subframes of length $T_{subframe}=1$ ms, as shown in FIG. 1. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 μs.

The resource allocation in LTE is typically described in terms of resource blocks, where a resource block corresponds to one slot (0.5 ms) in the time domain and 12 contiguous subcarriers in the frequency domain. A pair of two adjacent resource blocks in the time direction (i.e., 1.0 ms) is known as a resource block pair. This is also denoted as Transmission Time Interval (TTI).

DL transmissions are dynamically scheduled (i.e., in each subframe the base station transmits control information about which terminals data is transmitted to and upon which resource blocks the data is transmitted, in the current DL subframe). This control signaling is typically transmitted in the first 1, 2, 3 or 4 OFDM symbols in each subframe and the number n=1, 2, 3 or 4 is known as the Control Format Indicator (CFI) indicated by the Physical CFI Channel (PCFICH) transmitted in the first symbol of the control region. The control region also contains Physical Downlink Control Channels (PDCCHs) and possibly also Physical Hybrid Automatic Repeat Request (HARQ) Indication Channels (PHICHs) carrying Acknowledgement (ACK)/Negative Acknowledgement (NACK) for the UL transmission.

The DL subframe also contains common reference symbols (CRS), which are known to the receiver and used for coherent demodulation of, for example, the control information.

FIG. 2 illustrates an example downlink subframe 20A. More particularly, FIG. 2 illustrates an example DL system with CFI=3 OFDM symbols as control. In an LTE Release 8 TTI, one such portion of the DL transmission is referred to as one TTI.

Packet data latency is one of the performance metrics that vendors, operators, and also end-users (e.g., via speed-test applications) regularly measure. Latency measurements are done in all phases of a Radio Access Network (RAN) system lifetime (e.g., when verifying a new software release or system component, when deploying a system, and when the system is in commercial operation).

Shorter latency than previous generations of $3^{rd}$ Generation Partnership Project (3GPP) Radio Access Technologies (RATs) was one performance metric that guided the design of LTE. LTE is now recognized by end-users to be a system that provides faster access to the Internet and lower data latencies than previous generations of mobile radio technologies.

Packet data latency is important not only for the perceived responsiveness of the system; it is also a parameter that indirectly influences the throughput of the system. Hypertext Transfer Protocol (HTTP)/Transmission Control Protocol (TCP) is the dominating application and transport layer protocol suite used on the Internet today. The typical size of HTTP-based transactions over the Internet are in the range of a few 10s of kilobytes up to 1 megabyte. In this size range, the TCP slow-start period is a significant part of the total transport period of the packet stream. During the TCP slow-start period, the performance is latency limited. Hence, improved latency can rather easily be shown to improve the average throughput for this type of TCP-based data transaction.

Radio resource efficiency could be positively impacted by latency reductions. Lower packet data latency could increase the number of transmissions that are possible within a certain delay bound. Hence, higher Block Error Rate (BLER) targets could be used for the data transmissions, freeing up radio resources and potentially improving the capacity of the system.

One area to address when it comes to packet latency reductions is the reduction of transport time of data and control signaling by addressing the length of a TTI. In LTE Release 8, a TTI corresponds to one subframe of length 1 ms. One such 1 ms TTI is constructed by using 14 OFDM or Single Carrier-Frequency Division Multiple Access (SC-FDMA) symbols in the case of normal cyclic prefix and 12 OFDM or SC-FDMA symbols in the case of extended cyclic prefix. In LTE Release 13, a work item with the goal of specifying transmissions with shorter TTIs that are much shorter than the LTE Release 8 TTI is ongoing. The shorter TTIs can be decided to have any duration in time and comprise resources on a number of OFDM or SC-FDMA symbols within a 1 ms subframe. As one example, the duration of the short TTI (sTTI) may be 0.5 ms (i.e., seven OFDM or SC-FDMA symbols for the case with normal cyclic prefix). As another example, the duration of the sTTI may be 2 symbols.

As seen in FIG. 2, the TTI length consists of 14 OFDM symbols. With shortened TTIs, the TTI length can be reduced to 2-OFDM symbols, 4-OFDM symbols or 7-OFDM symbols. These are denoted as: 2-OS sTTI, 4-OS sTTI, 7-OS sTTI, respectively. As used herein, the OS can also be SC-FDMA or any type of symbol.

The shortened TTI can be used in different values in different direction, such as DL and UL. For example: a DL in a cell can use 2-OS sTTI, while an UL in the same cell can use 4-OS sTTI.

For different frame structures, such as FS1, FS2 and FS3, the sTTI that is used could be different too. The time domain structure described above in relation to FIG. 1 relates to FS1. For FS1, 2-OS, 4OS and 7 OS TTI can be used. For FS2 (which is used for Time Division Duplex (TDD)), 7-OS sTTI is one of the shortened TTI modes. Some example TTI durations are described below in relation to FIGS. 3-5.

FIG. 3 illustrates an example of a 7-symbol sTTI in DL. As can be seen from FIG. 3, subframe 20B is divided into two sTTIs 30A and 30B (also denoted in the example of FIG. 3 as TTI#0 and TTI#1, respectively). Each sTTI 30A and 30B consists of 7 symbols 32 (e.g., OFDM or SC-FDMA symbols). More particularly, sTTI 30A consists of symbols 32A-G and sTTI 30B consists of symbols 32H-N. In the example of FIG. 3, symbol 32D and symbol 32K contain reference signals (denoted by the notation "RS" in FIG. 3).

For 7-symbol sTTI, the sTTI structure in the example of FIG. 3 is supported for UL according to agreements in R1-1611055, 3GPP TSG-RAN WG1 #86 bis, Lisbon, Portugal 10-14 Oct. 2016, entitled "LS on Shortened TTI and processing time for LTE" (hereinafter "R1-1611055").

FIG. 4 illustrates an example of 4-symbol sTTI in DL. As can be seen from FIG. 4, subframe 20C is divided into four sTTIs 40A, 40B, 40C, and 40D (also denoted in the example of FIG. 4 as TTI#0, TTI#1, TTI#2, and TTI#3, respectively). Each sTTI 40A-D consists of 4 symbols 42 (e.g., OFDM or SC-FDMA symbols). More particularly, sTTI 40A consists of symbols 42A-42D, sTTI 40B consists of symbols 42D-G, sTTI 40C consists of symbols 42H-K, and sTTI 40D consists of symbols 42K-N. As can be seen from FIG. 4, sTTI 40A and sTTI 40B overlap (i.e., sTTI 40A and sTTI 40B both include symbol 42D) and sTTI 40C and sTTI 40D overlap (i.e., sTTI 40C and sTTI 40B both include symbol 42K). In the example of FIG. 4, symbols 42D and 42K contain reference signals (denoted by the notation "RS" in FIG. 4).

If 4-symbol UL sTTI is supported, the sTTI structure illustrated in the example of FIG. 4 is adopted, according to agreements in R1-1611055.

Figure 5:
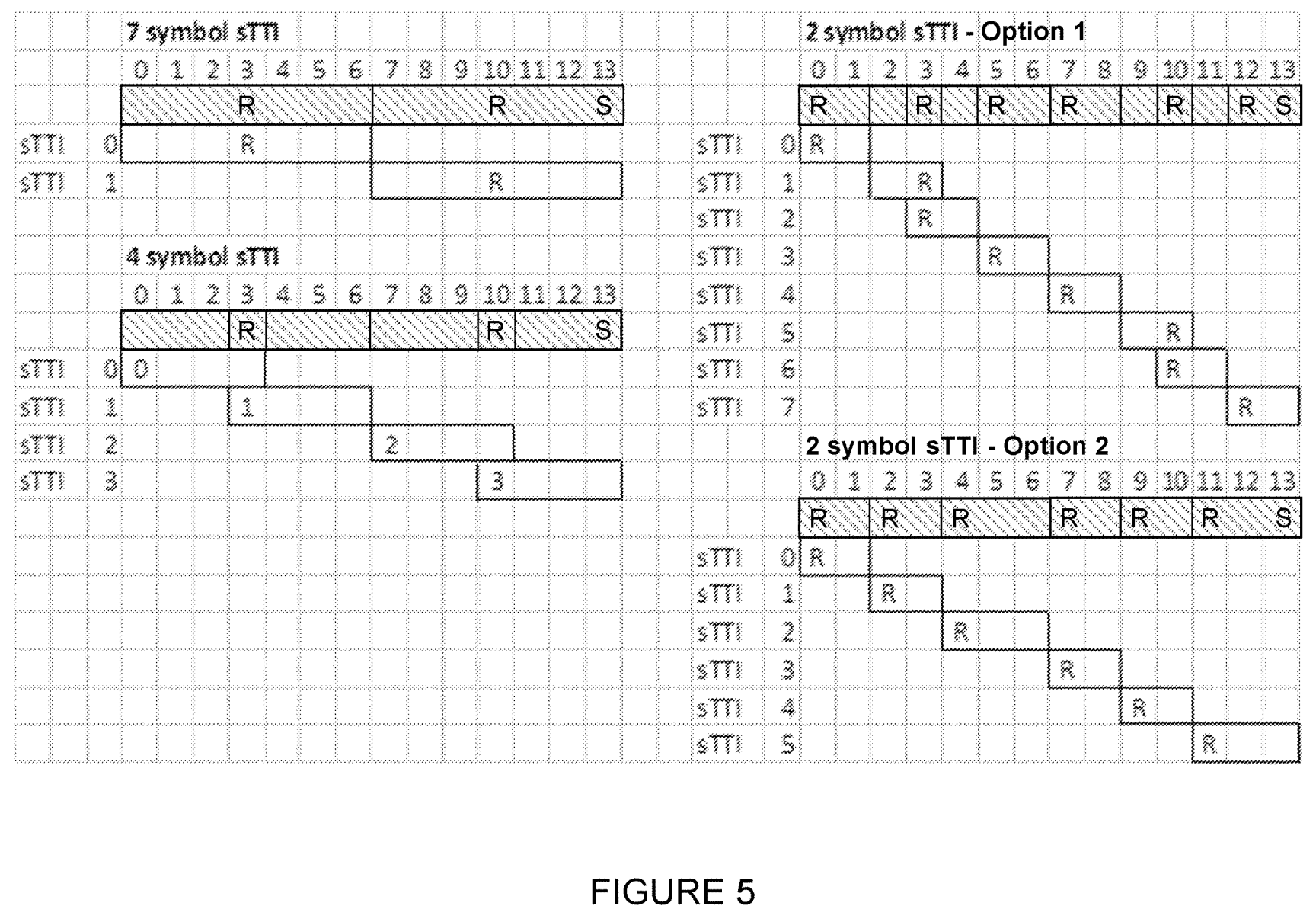

FIG. 5 illustrates examples of UL sTTI options. The examples illustrated in FIG. 5 show a proposal for different TTI lengths, including 7-symbol sTTI (i.e., 7-OS sTTI), 4-symbol sTTI (i.e., 4-OS sTTI), and 2 symbol sTTI (i.e., 2-OS sTTI). Similar to the example of FIG. 3 described above for the DL, with the 7-OS sTTI in the UL a subframe consisting of 14 symbols (e.g., OFDM or SC-FDMA symbols numbered 0-13 in the example of FIG. 5) is divided into two sTTIs (sTTI 0 and sTTI 1) consisting of 7 symbols each. In the 7-OS sTTI example of FIG. 5, sTTI 0 includes symbols 0-6 and sTTI 1 includes symbols 7-13, where symbols 3 and 10 contain reference signals (denoted "R" in the example of FIG. 5.

Similar to the example of FIG. 4 described above for the DL, with the 4-OS sTTI in the UL a subframe consisting of 14 symbols (e.g., OFDM or SC-FDMA symbols numbered 0-13 in the example of FIG. 5) is divided into four sTTIs (sTTI 0, sTTI 1, sTTI 2, and sTTI3) consisting of 4 symbols each. In the 4-OS sTTI example of FIG. 5, sTTI 0 includes symbols 0-3, sTTI 1 includes symbols 3-6, sTTI 2 includes symbols 7-10, and sTTI 3 includes symbols 10-13. As can be seen from the 4-OS sTTI example of FIG. 5, sTTI 0 and sTTI 1 overlap (i.e., sTTI 0 and sTTI 1 both include symbol 3) and sTTI 2 and sTTI 3 overlap (i.e., sTTI 2 and sTTI 3 both include symbol 10).

The 2-OS sTTI in the UL can have one of the two options illustrated in FIG. 5. With 2-OS sTTI Option 1, a subframe consisting of 14 symbols (e.g., OFDM or SC-FDMA symbols numbered 0-13 in the example of FIG. 5) is divided into 8 sTTIs (sTTI 0, sTTI 1, sTTI 2, sTTI 3, sTTI 4, sTTI 5, sTTI 6, and sTTI 7) consisting of two symbols each. In the 2-OS Option 1 example of FIG. 5, sTTI 0 includes symbols 0-1, sTTI 1 includes symbols 2-3, sTTI 2 includes symbols 3-4, sTTI 3 includes symbols 5-6, sTTI 4 includes symbols 7-8, sTTI 5 includes symbols 9-10, sTTI 6 includes symbols 10-11, and sTTI 7 includes symbols 12-13. As can be seen from the 2-OS sTTI Option 1 example of FIG. 5, sTTI 1 and sTTI 2 overlap (i.e., sTTI 1 and sTTI 2 both include symbol 3) and sTTI 5 and sTTI 6 overlap (i.e., both include symbol 10). In the 2-OS sTTI Option 1 example of FIG. 5, symbols 0, 3, 5, 7, 10, and 12 contain reference signals (denoted "R" in the example of FIG. 5), such as Demodulation Reference Signals (DMRS).

With 2-OS sTTI Option 2, a subframe consisting of 14 symbols (e.g., OFDM or SC-FDMA symbols numbered 0-13 in the example of FIG. 5) is divided into 6 sTTIs (sTTI 0, sTTI 1, sTTI 2, sTTI 3, sTTI 4, and sTTI 5) consisting of two or three symbols each. In the 2-OS Option 2 example of FIG. 5, sTTI 0 includes symbols 0-1, sTTI 1 includes symbols 2-3, sTTI 2 includes symbols 4-6, sTTI 3 includes symbols 7-8, sTTI 4 includes symbols 9-10, and sTTI 5 includes symbols 11-13. As can be seen from the 2-OS sTTI Option 2 example of FIG. 5, none of sTTI 0, sTTI 1, sTTI 2, sTTI 3, sTTI 4, and sTTI 5 overlap (i.e., do not share any symbols). In the 2-OS sTTI Option 2 example of FIG. 5, symbols 0, 2, 4, 7, 9, and 11 contain reference signals (denoted "R" in the example of FIG. 5), such as DMRS.

From the UL sTTI point of view, the following is observed. First, there are three different TTI lengths that are possible for UL. Out of these, different patterns are possible for 2OS TTI. Second, dynamic indication of TTI length in fast UL grant can be done. Third, dynamic indication of DMRS position in fast UL grant can also be done. Fourth, for some of the TTI patterns, shared DMRS is possible between UEs. For some UEs, this also means that they will need to send DMRS for two TTIs when the UE is scheduled across neighboring TTIs.

As stated in TS 36.101, v14.1.0, Section 6.3.4, "[t]he General ON/OFF time mask defines the observation period between Transmit OFF and ON power and between Transmit ON and OFF power. ON/OFF scenarios include; the beginning or end of DTX, measurement gap, contiguous, and non contiguous transmission. The OFF power measurement period is defined in a duration of at least one sub-frame excluding any transient periods. The ON power is defined as the mean power over one sub-frame excluding any transient period. There are no additional requirements on UE transmit power beyond that which is required in subclause 6.2.2 and subclause 6.6.2.3."

FIG. 6 illustrates an example of the general ON/OFF time mask. More particularly, FIG. 6 is reproduced from 3GPP TS 36.101, v14.1.0, FIG. 6.3.4.1-1. The ON/OFF time mask of FIG. 6 is designed for 1 ms TTI in Release 8 legacy LTE systems. The duration of ramping of power (e.g., the ramping up of power during the 20 μs transient period from the end of OFF power requirement to the start of ON power or the ramping down of power during the 20 μs transient period from the end of ON power to the start of OFF power requirement) in the mask is shorter compared to the length of sub-frame or slot, but its position has an influence on system performance. In terms of ramping up/down or transient position, a few non-limiting possibilities include: ramping outside timeslot/subframe; ramping inside timeslot/subframe; and ramping partly inside and outside timeslot/ subframe. Examples of these approaches to ramping up/down are illustrated in FIG. 7 described below.

FIG. 7 illustrates examples of the different possibilities for location of the power ramps. More particularly, FIG. 7 illustrates three examples 7-(A), 7-(B), and 7-(C) of ramping up and down of power in different possible locations in time in the mask. In example 7-(A), ramping up and down of power takes place outside subframe 20D. In example 7-(B), ramping up and down of power takes place inside subframe 20E. In example 7-(C), ramping up and down of power takes place partially inside and partially outside subframe 20F.

In the current specifications, the transient period for ON/OFF mask with 1 ms TTI duration is defined as 20 μs, which is quite small compared to 1 ms TTI duration. However, a shorter TTI length (as short as 2-OS sTTI compared to 14-OS (i.e., 1 ms)) may mean that the transient period can become quite significant compared to TTI duration. For example, for 2-OS TTI duration a 20 μs transient period will be roughly $1/7^{th}$ of the TTI duration, which will reduce the system performance significantly.

SUMMARY

To address the foregoing problems with existing solutions, disclosed is a method in a wireless device. The method comprises obtaining a first transmission time interval (TTI) for transmitting a first signal. The method comprises determining, based on the obtained first TTI, a first transient time associated with the first TTI, the first transient time defining a first duration during which a transmit power level of the wireless device changes. The method comprises transmitting the first signal using the determined first transient time when transmitting the first signal. The method comprises obtaining a second TTI for transmitting a second signal, wherein a length of the second TTI is different from a length of the first TTI. The method comprises determining, based on the obtained second TTI, a second transient time associated with the second TTI, the second transient time defining a second duration during which the transmit power level of the wireless device changes, wherein the second transient time is different from the first transient time. The method comprises transmitting the second signal using the determined second transient time when transmitting the second signal.

In certain embodiments, the method may comprise determining the first transient time associated with the first TTI based on the length of the first TTI, and determining the second transient time associated with the second TTI based on the length of the second TTI.

In certain embodiments, the first transient time associated with the first TTI may be a function of one or more of: the first TTI; a TTI interval used in an uplink of a serving cell of the wireless device; a TTI interval used in a downlink of the serving cell of the wireless device; a type of the first signal; a number of consecutive uplink TTIs before or after a transient period; and a number of consecutive downlink TTIs before or after the transient period. In certain embodiments, the second transient time associated with the second TTI may be a function of one or more of: the second TTI; a TTI interval used in an uplink of a serving cell of the wireless device; a TTI interval used in a downlink of the serving cell of the wireless device; a type of the second signal; a number of consecutive uplink TTIs before or after a transient period; and a number of consecutive downlink TTIs before or after the transient period.

In certain embodiments, at least one of determining the first transient time associated with the first TTI and determining the second transient time associated with the second TTI may be performed using one or more mapping tables. In certain embodiments, the length of the second TTI may be shorter than the length of the first TTI, and a duration of the first transient time and a duration of the second transient time may be linearly scaled with respect to TTI length according to one or more predefined rules, such that the duration of the second transient time associated with the second TTI is shorter than the duration of the first transient time associated with the first TTI. In certain embodiments, the length of the second TTI may be shorter than the length of the first TTI, and a duration of the first transient time and a duration of the second transient time may be non-linearly scaled with respect to TTI length according to one or more predefined rules, such that the duration of the second transient time associated with the second TTI is shorter than the duration of the first transient time associated with the first TTI.

In certain embodiments, at least one of determining the first transient time associated with the first TTI and determining the second transient time associated with the second TTI may be further based on a scaling factor. In certain embodiments, the method may comprise receiving the scaling factor from a network node.

In certain embodiments, the method may comprise at least one of: determining the first transient time associated with the first TTI based on whether the length of the first TTI is above a threshold value; and determining the second transient time associated with the second TTI based on whether the length of the second TTI is above the threshold value.

In certain embodiments, at least one of the first TTI and the second TTI may be one of: a shortened TTI; a transmission time for encoding and interleaving one or more signals; a slot; a sub-slot; a mini-slot, a short subframe; and a mini-subframe.

Also disclosed is a wireless device. The wireless device comprises a receiver, a transmitter, and processing circuitry coupled to the receiver and the transmitter. The processing circuitry is configured to obtain a first transmission time interval (TTI) for transmitting a first signal. The processing circuitry is configured to determine, based on the obtained first TTI, a first transient time associated with the first TTI, the first transient time defining a first duration during which a transmit power level of the wireless device changes. The processing circuitry is configured to transmit, via the transmitter, the first signal using the determined first transient time when transmitting the first signal. The processing circuitry is configured to obtain a second TTI for transmitting a second signal, wherein a length of the second TTI is different from a length of the first TTI. The processing circuitry is configured to determine, based on the obtained second TTI, a second transient time associated with the second TTI, the second transient time defining a second duration during which the transmit power level of the wireless device changes, wherein the second transient time is different from the first transient time. The processing circuitry is configured to transmit, via the transmitter, the second signal using the determined second transient time when transmitting the second signal.

Also disclosed is a method in a network node. The method comprises configuring a wireless device with a first transmission time interval (TTI) for transmitting a first signal. The method comprises determining, based on the configured first TTI, a first transient time associated with the first TTI, the first transient time defining a first duration during which a transmit power level of the wireless device changes. The method comprises receiving the first signal transmitted by the wireless device using the determined first transient time.

The method comprises configuring the wireless device with a second TTI for transmitting a second signal, wherein a length of the second TTI is different from a length of the first TTI. The method comprises determining, based on the configured second TTI, a second transient time associated with the second TTI, the second transient time defining a second duration during which the transmit power level of the wireless device changes, wherein the second transient time is different from the first transient time. The method comprises receiving the second signal transmitted by the wireless device using the determined second transient time.

In certain embodiments, the method may comprise determining the first transient time associated with the first TTI based on the length of the first TTI, and determining the second transient time associated with the second TTI based on the length of the second TTI.

In certain embodiments, the method may comprise determining at least one of the first TTI and the second TTI based on one or more of: a capability of the wireless device; a required bit rate of the wireless device; a round trip time required to deliver data between the wireless device and the network node; and a location of the wireless device.

In certain embodiments, the first transient time associated with the first TTI may be a function of one or more of: the first TTI; a TTI interval used in an uplink of a serving cell of the wireless device; a TTI interval used in a downlink of the serving cell of the wireless device; a type of the first signal; a number of consecutive uplink TTIs before or after a transient period; and a number of consecutive downlink TTIs before or after the transient period. In certain embodiments, the second transient time associated with the second TTI may be a function of one or more of: the second TTI; a TTI interval used in an uplink of a serving cell of the wireless device; a TTI interval used in a downlink of the serving cell of the wireless device; a type of the second signal; a number of consecutive uplink TTIs before or after a transient period; and a number of consecutive downlink TTIs before or after the transient period.

In certain embodiments, at least one of determining the first transient time associated with the first TTI and determining the second transient time associated with the second TTI may be performed using one or more mapping tables. In certain embodiments, the length of the second TTI may be shorter than the length of the first TTI, and a duration of the first transient time and a duration of the second transient time may be linearly scaled with respect to TTI length according to one or more predefined rules, such that the duration of the second transient time associated with the second TTI is shorter than the duration of the first transient time associated with the first TTI. In certain embodiments, the length of the second TTI may be shorter than the length of the first TTI, and a duration of the first transient time and a duration of the second transient time may be non-linearly scaled with respect to TTI length according to one or more predefined rules, such that the duration of the second transient time associated with the second TTI is shorter than the duration of the first transient time associated with the first TTI.

In certain embodiments, determining the first transient time associated with the first TTI and determining the second transient time associated with the second TTI may be further based on a scaling factor. In certain embodiments, the method may comprise sending the scaling factor to the wireless device.

In certain embodiments, the method may comprise determining the first transient time associated with the first TTI based on whether the length of the first TTI is above a threshold value, and determining the second transient time associated with the second TTI based on whether the length of the second TTI is above the threshold value.

In certain embodiments, the method may comprise using at least one of the determined first transient time and the determined second transient time for one or more operational tasks. In certain embodiments, the one or more operational tasks may comprise one or more of: performing one or more radio measurements; adapting a TTI of the wireless device; performing power control operation of the wireless device in the first cell; scheduling of one or more of data and signals in the first cell; and adapting a receiver configuration of the network node for receiving signals from the wireless device in the first cell.

In certain embodiments, at least one of the first TTI and the second TTI may be one of: a shortened TTI; a transmission time for encoding and interleaving one or more signals; a slot; a sub-slot; a mini-slot, a short subframe; and a mini-subframe.

Also disclosed is a network node. The network node comprises a receiver, a transmitter, and processing circuitry coupled to the receiver and the transmitter. The processing circuitry is configured to configure a wireless device with a first transmission time interval (TTI) for transmitting a first signal. The processing circuitry is configured to determine, based on the configured first TTI, a first transient time associated with the first TTI, the first transient time defining a first duration during which a transmit power level of the wireless device changes. The processing circuitry is configured to receive, via the receiver, the first signal transmitted by the wireless device using the determined first transient time. The processing circuitry is configured to configure the wireless device with a second TTI for transmitting a second signal, wherein a length of the second TTI is different from a length of the first TTI. The processing circuitry is configured to determine, based on the configured second TTI, a second transient time associated with the second TTI, the second transient time defining a second duration during which the transmit power level of the wireless device changes, wherein the second transient time is different from the first transient time. The processing circuitry is configured to receive, via the receiver, the second signal transmitted by the wireless device using the determined second transient time.

Certain embodiments of the present disclosure may provide one or more technical advantages. For example, certain embodiments may advantageously reduce or eliminate the reduction in system performance that can occur when the same transient time is used for transmitting signals without regard to the type of TTI to be used for transmitting the signals. As another example, certain embodiments may advantageously provide well-defined wireless device behavior with respect to the transient time parameter used for different TTI patterns. As another example, certain embodiments may advantageously provide well-defined wireless device behavior with respect to the transient time parameter(s) when different TTI patterns are used in consecutive TTIs and the wireless device is allocated resources in these consecutive TTIs. As still another example, certain embodiments may advantageously provide well-defined wireless device behavior with respect to transient time parameter(s) when different TTI patterns are used in consecutive TTIs and the wireless device is allocated overlapping resources in these consecutive TTIs (such as 4-OS TTI arrangements). As yet another example, certain embodiments may advantageously enhance operations related to the transmission of signals by wireless devices configured with the same or different TTIs on different serving cells in carrier aggregation. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 5 illustrates examples of UL sTTI options;

DETAILED DESCRIPTION

Figure 1:
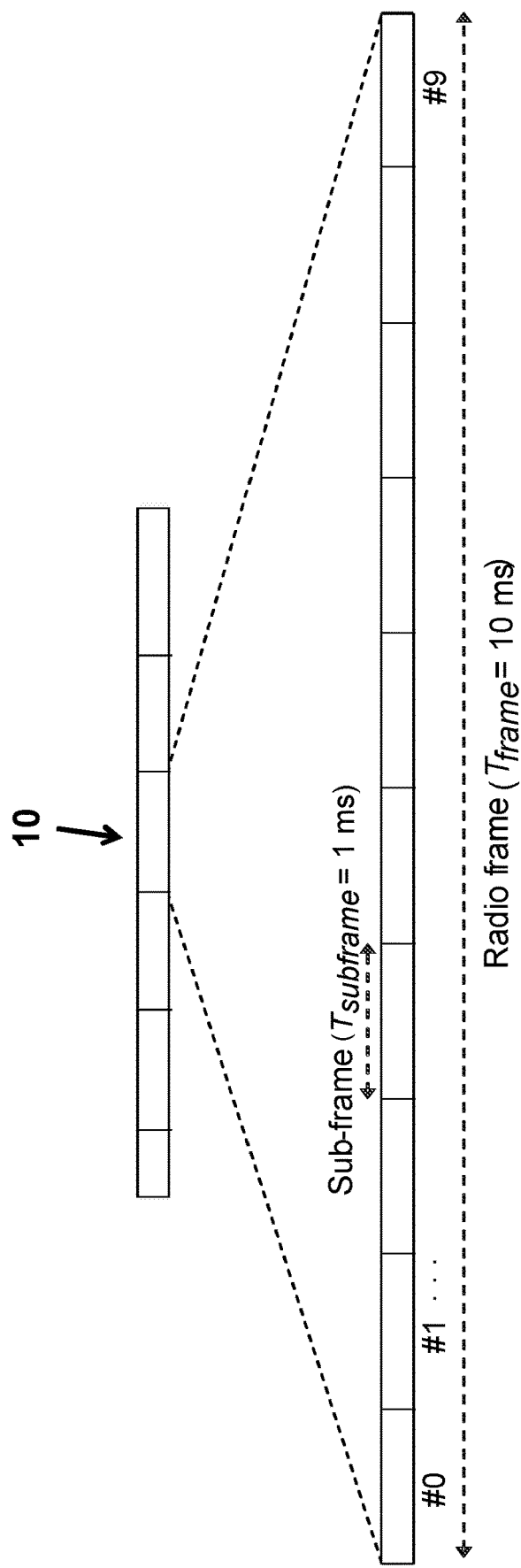
FIG. 1 illustrates an example of the LTE time-domain structure.
Figure 2:
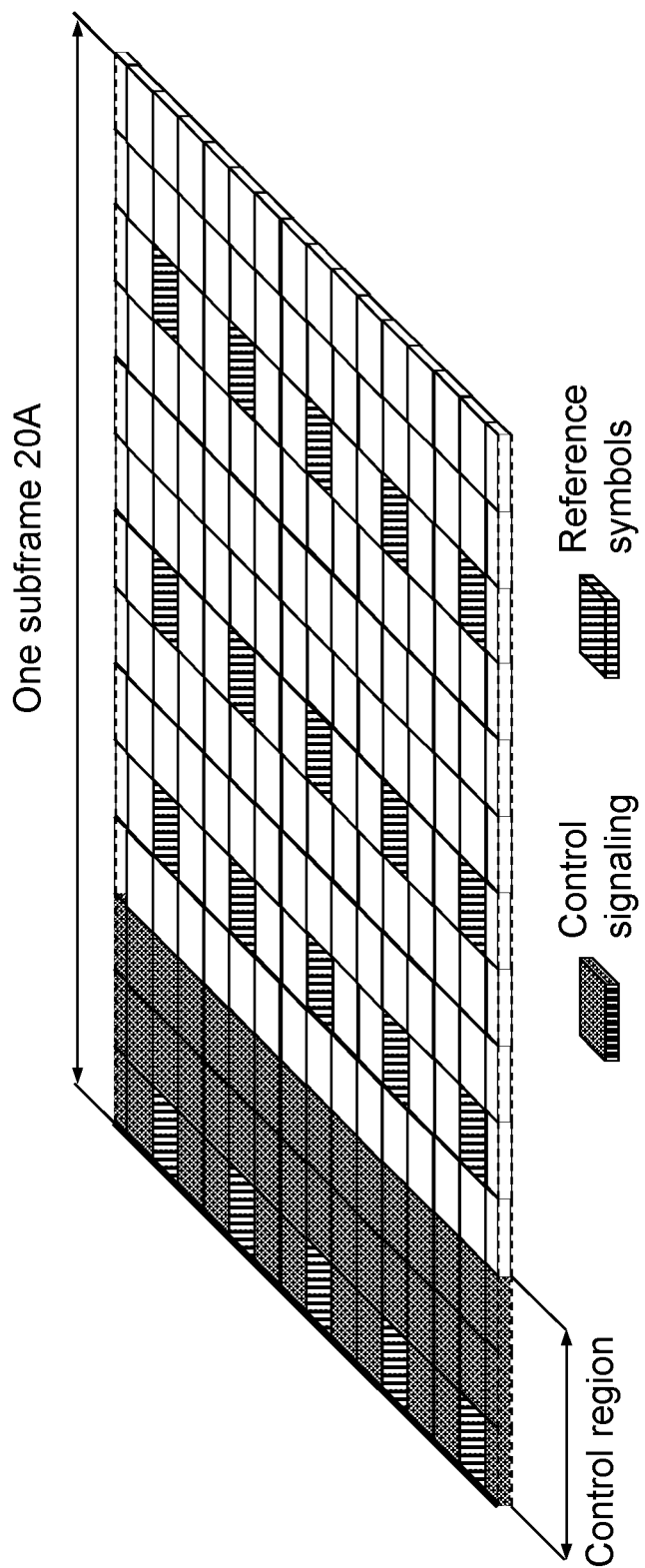
FIG. 2 illustrates an example downlink subframe.
Figure 3:
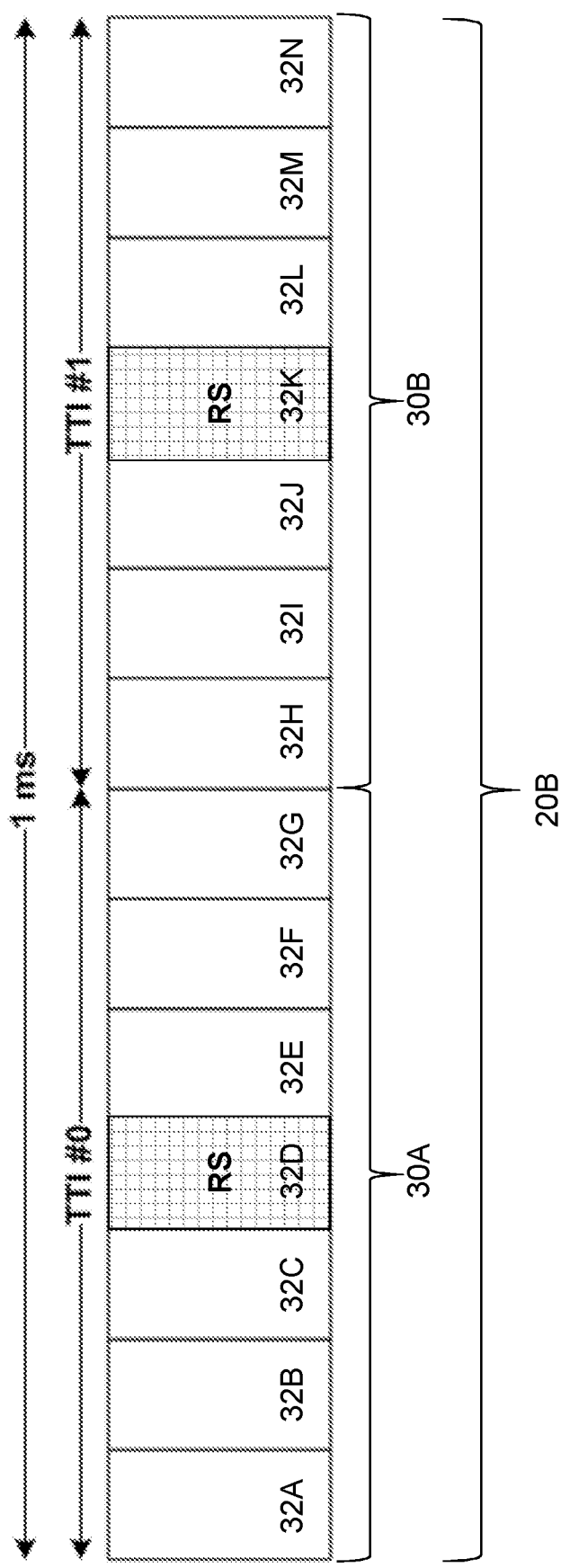
FIG. 3 illustrates an example of a 7-symbol sTTI in DL.
Figure 4:
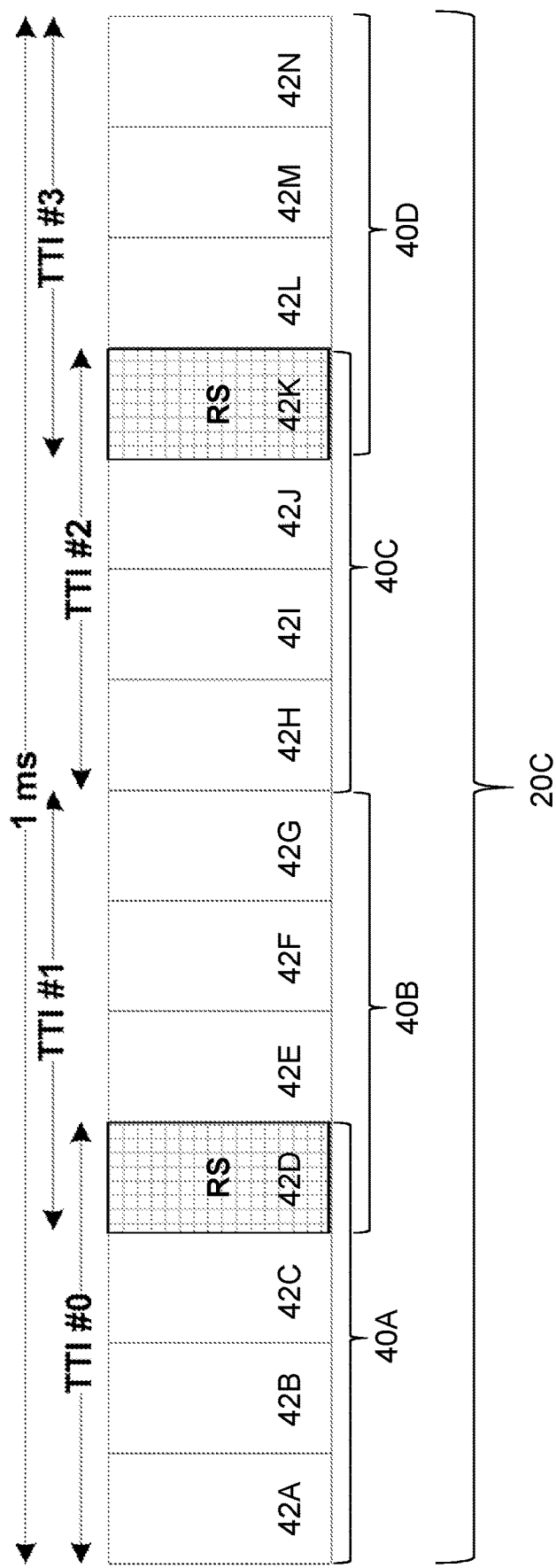
FIG. 4 illustrates an example of 4-symbol sTTI in DL.
Figure 6:
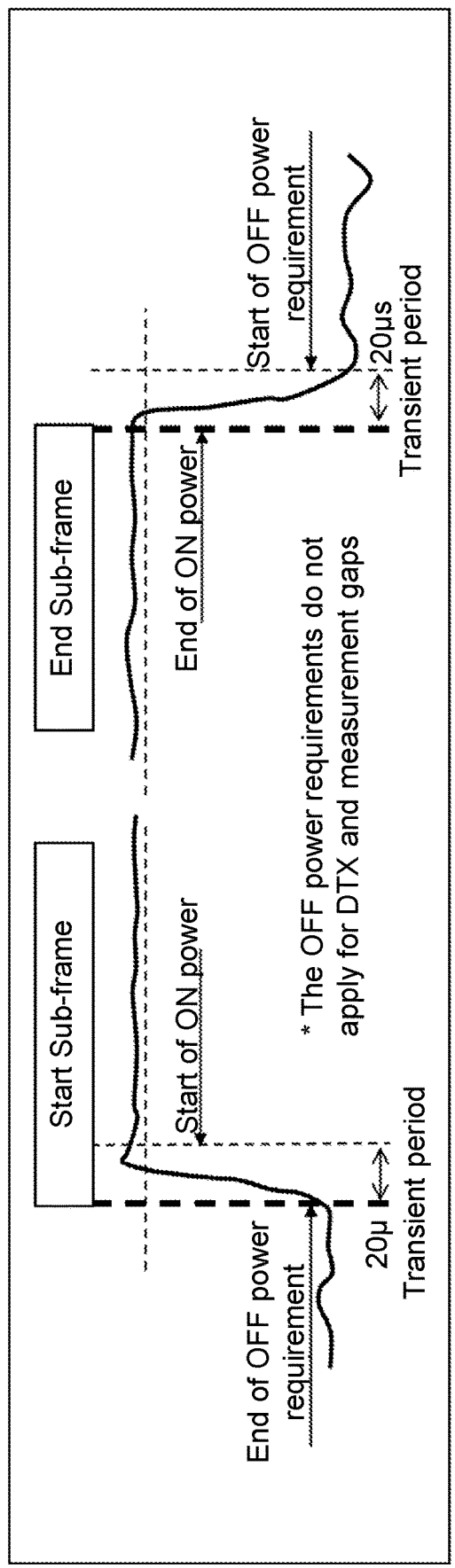
FIG. 6 illustrates an example of the general ON/OFF time mask.
Figure 7:
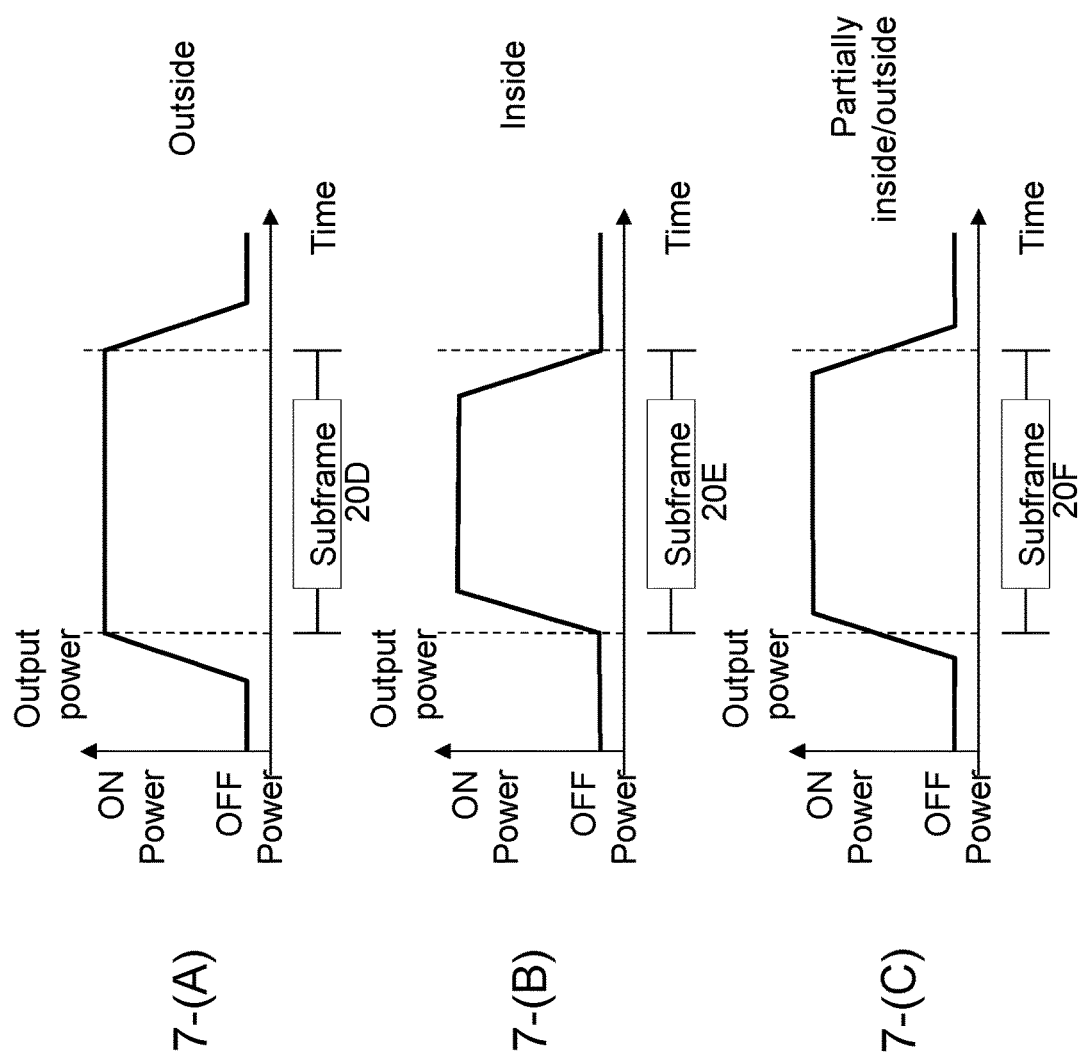
FIG. 7 illustrates examples of the different possibilities for location of the power ramps.

As described above, in the current specifications, the transient period for ON/OFF mask with 1 ms TTI duration is defined as 20 µs, which is quite small compared to the 1 ms TTI duration. However, with shorter TTI length (as short as 2-OS compared to 14-OS (or 1 ms)) may mean that the transient period can become quite significant compared to TTI duration. For example, with 2-OS TTI duration, a 20 µs transient period will be roughly $\frac{1}{7}^{th}$ of the TTI duration, which will reduce the system performance significantly.

The present disclosure contemplates various embodiments that may address these and other deficiencies associated with existing approaches. In certain embodiments, this is achieved by enabling a wireless device to change the transient time it uses when transmitting a particular signal (e.g., to a network node or another wireless device) based on the TTI the wireless device is configured to use for transmitting the particular signal. For example, a wireless device may support transmissions using a variety of different TTIs. Initially, the wireless device may be configured to transmit a first signal using a first TTI (e.g., a 1 ms TTI). Based on the first TTI, the wireless device can determine that a first transient time (e.g., 20 µs) should be used for transmitting the first signal. The wireless device can then transmit the first signal using the determined first transient time to, for example, a network node. Subsequently, the wireless device may be configured to transmit a second signal using a second, different TTI (e.g., an sTTI such as a 2-OS, 4-OS, or 7-OS sTTI). Based on the second TTI, the wireless device may determine that a second, different (e.g., shorter) transient time (e.g., 10 µs) should be used for transmitting the second signal. The wireless device can then transmit the second signal using the determined second transient time to, for example, the network node. In certain embodiments, the use of different transient times for different signals (e.g., a shorter transient time for signals to be transmitted using a shortened TTI) may advantageously reduce or eliminate the reduction in system performance that occurs when the same transient time is used for transmitting signals without regard to the type of TTI to be used for transmitting the signals.

According to one example embodiment, a method in a wireless device (e.g., a UE) is disclosed. The wireless device obtains a first TTI for transmitting a first signal. The wireless device determines, based on the obtained first TTI, a first transient time associated with the first TTI. In certain embodiments, the first transient time defines a first duration during which a transmit power level of the wireless device changes. The wireless device transmits the first signal using the determined first transient time when transmitting the first signal. The wireless device obtains a second TTI for transmitting a second signal. In certain embodiments, a length of the second TTI is different from a length of the first TTI. The wireless device determines, based on the obtained second TTI, a second transient time associated with the second TTI. In certain embodiments, the second transient time defines a second duration during which the transmit power level of the wireless device changes. In certain embodiments, the second transient time may be different from the first transient time. The wireless device transmits the second signal using the determined second transient time when transmitting the second signal.

As described in more detail below, the wireless device may obtain the first TTI for transmitting the first signal and the second TTI for transmitting the second signal in a variety of ways. Similarly, the wireless device may determine the first transient time associated with the first TTI and the second transient time associated with the second TTI in a variety of ways, as described in more detail below.

According to another example embodiment, a method in a network node (e.g., evolved Node B (eNB) or gNodeB (gNB)) is disclosed. The network node configures a wireless device with a first TTI for transmitting a first signal. The network node determines, based on the configured first TTI, a first transient time associated with the first TTI. In certain embodiments, the first transient time defines a first duration during which a transmit power level of the wireless device changes. The network node receives the first signal transmitted by the wireless device using the determined first transient time. The network node configures the wireless device with a second TTI for transmitting a second signal. In certain embodiments, a length of the second TTI is different from a length of the first TTI. The network node determines, based on the configured second TTI, a second transient time associated with the second TTI. In certain embodiments, the second transient time defines a second duration during which the transmit power level of the wireless device changes. In certain embodiments, the second transient time may be different from the first transient time. The network node receives the second signal transmitted by the wireless device using the determined second transient time.

As described in more detail below, the wireless device may determine the first transient time associated with the first TTI and the second transient time associated with the second TTI in a variety of ways. In certain embodiments, the network node may use at least one of the determined first transient time and the determined second transient time for one or more operational tasks, as described in more detail below.

Certain embodiments of the present disclosure may provide one or more technical advantages. For example, certain embodiments may advantageously reduce or eliminate the reduction in system performance that can occur when the same transient time is used for transmitting signals without regard to the type of TTI to be used for transmitting the signals. As another example, certain embodiments may advantageously provide well-defined wireless device behavior with respect to the transient time parameter used for different TTI patterns. As another example, certain embodiments may advantageously provide well-defined wireless device behavior with respect to the transient time parameter(s) when different TTI patterns are used in consecutive TTIs and the wireless device is allocated resources in these consecutive TTIs. As still another example, certain embodiments may advantageously provide well-defined wireless device behavior with respect to transient time parameter(s) when different TTI patterns are used in consecutive TTIs and the wireless device is allocated overlapping resources in these consecutive TTIs (such as 4-OS TTI arrangements). As yet another example, certain embodiments may advantageously enhance operations related to the transmission of signals by wireless devices configured with the same or different TTIs on different serving cells in carrier aggregation. Other advantages may be readily apparent to one having skill in the art. Certain embodiments may have none, some, or all of the recited advantages.

Figure 8:
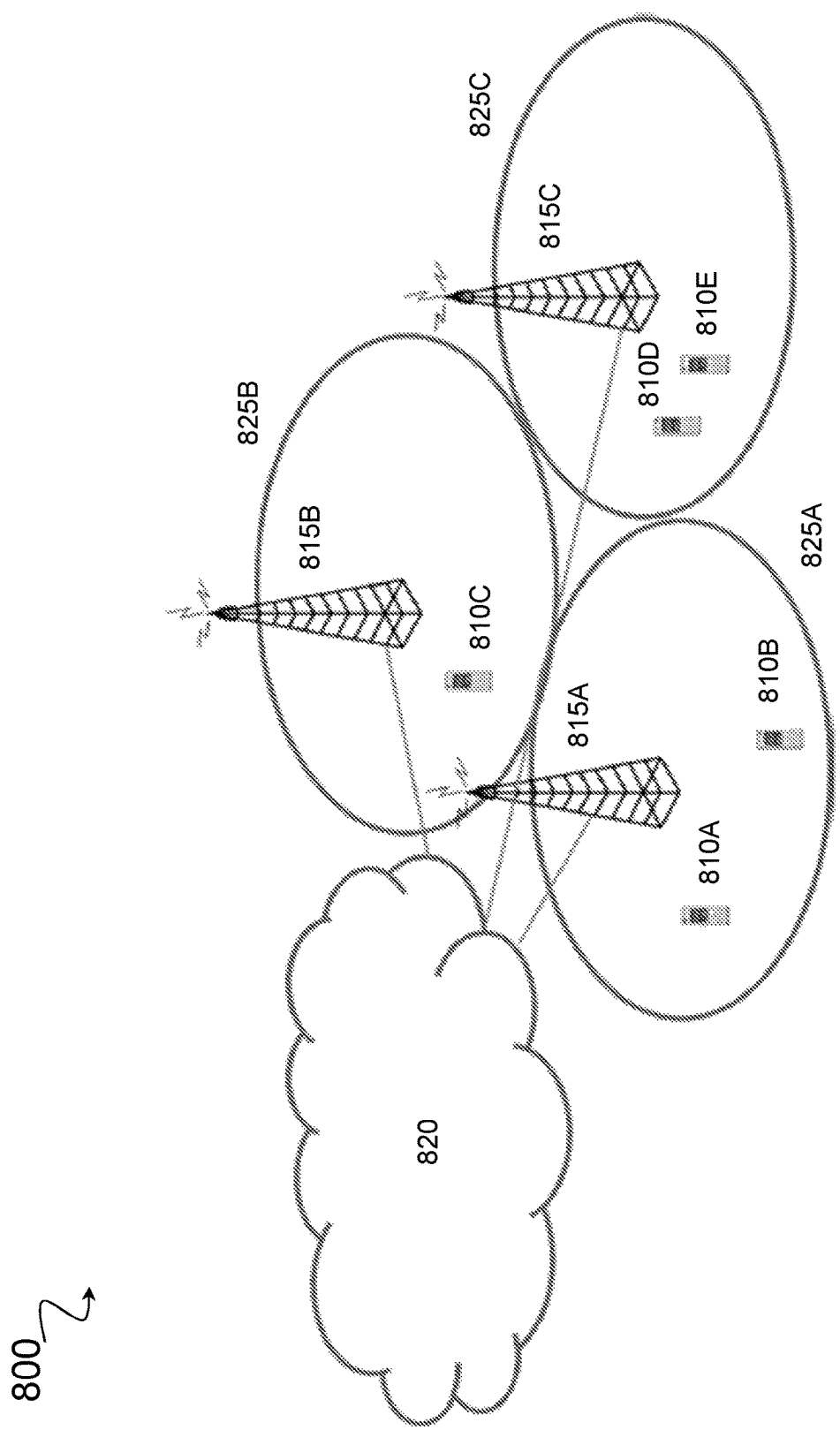
FIG. 8 is a block diagram illustrating an embodiment of a network, in accordance with certain embodiments.

FIG. 8 is a block diagram illustrating an embodiment of a network 800, in accordance with certain embodiments. Network 800 includes one or more wireless devices 810 (e.g., UEs), and one or more network node(s) 815 (e.g., eNBs or gNBs). More particularly, in the example of FIG. 8 network 800 includes wireless devices 810A-E and network nodes 815A-C. Wireless devices 810 may communicate with network nodes 815 over a wireless interface. For example, a wireless device 810 may transmit wireless signals to one or more of network nodes 815, and/or receive wireless signals from one or more of network nodes 815. The wireless signals may contain voice traffic, data traffic, control signals, and/or any other suitable information. In some embodiments, each network node 815 has an associated area of wireless signal coverage 825 (e.g., network node 815A has an associated area of wireless signal coverage 825A, network node 815B has an associated area of wireless signal coverage 825B, and network node 815C has an associated area of wireless signal coverage 825C). In some embodiments, wireless devices 810 may have device-to-device (D2D) capability. Thus, wireless devices 810 may be able to receive signals from and/or transmit signals directly to another wireless device.

Wireless devices 810 may be configured to operate in carrier aggregation (CA), implying aggregation of two or more carriers in at least one of DL and UL directions. As used herein, the term fallback mode refers to a CA configuration which contains fewer component carriers (CCs) than the maximum number of CCs in a CA combination supported by a wireless device 810. For example, a wireless device 810 supporting a CA combination with a maximum CA configuration of 4 DL CCs and 1 UL CC may support the following 3 fallback modes: 3 DL CCs and 1 UL CC; 1 DL CCs and 1 UL CC; and DL CC and 1 UL CC (i.e., single carrier operation). The term fallback mode may also be interchangeably referred to as lower order CA combination, lower order CA configuration, fallback CA mode, fallback CA configuration mode, fallback CA combination etc.

As used herein, a CC may also be interchangeably referred to as a carrier, an aggregated carrier, a Primary Component Carrier (PCC), or a Secondary Component Carrier (SCC) configured at a wireless device 810 by a network node 815 using higher layer signaling (e.g., by sending a Radio Resource Control (RRC) configuration message to the wireless device 810). The configured CC is used by the network node 815 for serving the wireless device 810 on the serving cell (e.g., on Primary Cell (PCell), Primary Secondary Cell (PSCell), Secondary Cell (SCell), etc.) of the configured CC. The configured CC is also used by the wireless device 810 for performing one or more radio measurements (e.g., Reference Signal Received Power (RSRP), Reference Signal Received Quality (RSRQ), etc.) on the cells operating on the CC (e.g., PCell, SCell or PSCell and neighboring cells).

With CA, a wireless device 810 can have multiple serving cells, wherein the term "serving" herein means that the wireless device 810 is configured with the corresponding serving cell and may receive from and/or transmit data to a network node 815 on the serving cell (e.g., on PCell or any of the SCells). The data is transmitted or received via physical channels (e.g., Physical Downlink Shared Channel (PDSCH) in DL, Physical Uplink Shared Channel (PUSCH) in UL, etc.).

In certain embodiments, network nodes 815 may interface with a radio network controller (RNC). The RNC may control network nodes 815 and may provide certain radio resource management functions, mobility management functions, and/or other suitable functions. In certain embodiments, the functions of the RNC may be included in network node 815. The RNC may interface with a core network node. In certain embodiments, the RNC may interface with the core network node via an interconnecting network 820. Interconnecting network 820 may refer to any interconnecting system capable of transmitting audio, video, signals, data, messages, or any combination of the preceding. Interconnecting network 820 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 810. Wireless devices 810 may exchange certain signals with the core network node using the non-access stratum layer. In non-access stratum signaling, signals between wireless devices 810 and the core network node may be transparently passed through the radio access network. In certain embodiments, network nodes 815 may interface with one or more network nodes over an internode interface, such as, for example, an X2 interface.

As described above, example embodiments of network 800 may include one or more wireless devices 810, and one or more different types of network nodes capable of communicating (directly or indirectly) with wireless devices 810.

In some embodiments, the non-limiting term wireless device is used. Wireless devices 810 described herein can be any type of wireless device capable of communicating with network nodes 815 or another wireless device in a cellular or mobile communication system (e.g., over radio signals). Examples of wireless devices include a UE, a radio communication device, target device, UE, D2D UE, machine-type-communication (MTC) UE or UE capable of machine-to-machine (M2M) communication, low-cost and/or low-complexity UE, a sensor equipped with UE, tablet, Personal Digital Assistant (PDA), mobile terminals, smart phone, laptop embedded equipped (LEE), laptop mounted equipment (LME), USB dongles, Customer Premises Equipment (CPE), etc. Wireless devices 810 may operate under either normal coverage or enhanced coverage with respect to its serving cell. The enhanced coverage may be interchangeably referred to as extended coverage. Wireless devices 810 may also operate in a plurality of coverage levels (e.g., normal coverage, enhanced coverage level 1, enhanced coverage level 2, enhanced coverage level 3 and so on). In some cases, wireless devices 810 may also operate in out-of-coverage scenarios.

Also, in some embodiments the non-limiting term network node is used. It can be any kind of network node or radio network node. Examples of network nodes include a base station (BS), radio BS, Node B, multi-standard radio (MSR) radio node such as MSR BS, eNB, Master eNB (MeNB), Secondary eNB (SeNB), gNB, network controller, RNC, BS controller (BSC), relay node, donor node controlling relay, base transceiver station (BTS), access point (AP), radio AP, transmission point, transmission node, Remote Radio Unit (RRU), Remote Radio Head (RRH), nodes in distributed antenna system (DAS), Multi-cell/multicast Coordination Entity (MCE), core network node (e.g., Mobile Switching Center (MSC), Mobility Management Entity (MME), etc.), Operations & Management (O&M), Operations Support System (OSS), Self-Organizing Network (SON), positioning node (e.g., Evolved-Serving Mobile Location Center (E-SMLC)), Minimization of Drive Test (MDT), or any other suitable network node.

The terminology such as network node and wireless device should be considered non-limiting and does not imply a certain hierarchical relation between the two; in general "network node" could be considered as device 1 and "wireless device" as device 2, and these two devices communicate with each other over some radio channel.

Example embodiments of wireless devices 810, network nodes 815, and other network nodes (such as RNC or core network node) are described in more detail below with respect to FIGS. 11-15.

Although FIG. 8 illustrates a particular arrangement of network 800, the present disclosure contemplates that the various embodiments described herein may be applied to a variety of networks having any suitable configuration. For example, network 800 may include any suitable number of wireless devices 810 and network nodes 815, as well as any additional elements suitable to support communication between wireless devices or between a wireless device and another communication device (such as a landline telephone). Furthermore, although certain embodiments may be described as implemented in an LTE network, the embodiments may be implemented in any appropriate type of telecommunication system supporting any suitable communication standards (including 5G standards) and using any suitable components, and are applicable to any RAT or multi-RAT systems in which a wireless device receives and/or transmits signals (e.g., data). For example, the various embodiments described herein may be applicable to LTE, LTE-Advanced, New Radio (NR), 4G, 5G, Narrowband Internet-of-Things (NB-IoT), MulteFire, UTRA, E-UTRA, UMTS, HSPA, GSM, cdma2000, WCDMA, WiMax, UMB, WiFi, Bluetooth, another suitable radio access technology, or any suitable combination of one or more radio access technologies. In certain embodiments, wireless devices 810 and network nodes 815 may be capable of supporting a single or multiple RATs. Although certain embodiments may be described in the context of wireless transmissions in the UL, the present disclosure contemplates that the various embodiments are equally applicable in the DL.

As described above, in the current specifications, the transient period for ON/OFF mask with 1 ms TTI duration is defined as 20 µs, which is quite small compared to the 1 ms TTI duration. However, a shorter TTI length (as short as 2-OS compared to 14-OS (or 1 ms)) may mean that the transient period can become quite significant compared to TTI duration. For example, with 2-OS TTI duration, a 20 µs transient period will be roughly $\frac{1}{7}^{th}$ of the TTI duration, which will reduce the system performance significantly. Certain embodiments described herein may advantageously reduce or eliminate this reduction in system performance by enabling a wireless device 810 (e.g., wireless device 810A) to change the transient time it uses when transmitting a particular signal based on the TTI wireless device 810A is configured to use for transmitting the particular signal. In the description that follows, example scenarios involving the use of different TTI patterns by wireless device 810A operating in network 800 are described, followed by a description of various embodiments that may be advantageously used to address the problems associated with existing approaches. Although certain embodiments may be described below in the context of a particular wireless device and network node (e.g., wireless device 810A and network node 815A, respectively), the various embodiments are applicable to any suitable wireless device 810 and/or network node 815 operating in network 800.

Wireless device 810A (e.g., a UE) may be configured with at least one serving cell (e.g., PCell) (also known as single-carrier operation). Wireless device 810A may be capable of using at least two different TTIs (e.g., a TTI of 1 ms and a sTTI of 2-OS, or other suitable combination of TTIs). In certain embodiments, wireless device 810A can be configured with any one of the plurality of TTIs supported by wireless device 810A in one time resource in the serving cell. As used herein, the term time resource may correspond to any type of physical resource or radio resource expressed in terms of length of time. Examples of time resources include: symbol, time slot, subframe, short subframe, radio frame, TTI, interleaving time, etc.

In certain embodiments, wireless device 810A may further be capable of supporting operation whereby the TTI is changed over time in the serving cell. In some cases, wireless device 810A may further be capable of supporting operation using a different TTI in UL and DL of the serving cell. An example of the basic scenario is described in Table 1 below:

TABLE 1

An example of the basic scenario of TTI pattern

| No. | Cases | Examples of TTI patterns |
|---|---|---|
| 1 | Same TTI pattern is used in a cell continuously | TTI = 2-OS is used in all time resources in cell1 |
| 2 | Different TTI patterns are used in a cell in different time resources | TTI = 2-OS and TTI = 1 ms are used in different resources in cell1. |

TABLE 1-continued

An example of the basic scenario of TTI pattern

| No. | Cases | Examples of TTI patterns |
|---|---|---|
| 3 | Different TTI patterns are used in the UL and DL of the same cell | TTI = 2-OS is used in DL of cell1 and TTI = 7-OS is used in UL of cell1 |
| 4 | Any combination of cases 2 and 3 above | TTI = 2-OS and TTI = 7-OS are used in different resources in DL of cell1, whereas TTI = 7-OS is used in UL in all time resources in cell1. |

In certain embodiments, wireless device 810A may be configured with at least two serving cells (e.g., PCell and SCell, etc.) (also known as CA or multicarrier operation). In such a scenario, wireless device 810A may be capable of using at least two different TTIs (e.g., TTI of 1 ms and TTI of 2-OS, or other suitable combination of TTIs). Wireless device 810A may be configured with any one of the plurality of TTIs supported by wireless device 810A in different serving cells (e.g., TTI=1 for operation on both PCell and SCell or TTI=2-OS for operation on both PCell and SCell).

In certain embodiments, wireless device 810A may also be configured with any different TTIs in different serving cells (e.g., TTI=1 and TTI=7-OS for operation on PCell and SCell, respectively). Wireless device 810A may further be capable of supporting operation whereby the TTI is changed over time in one or more serving cells of wireless device 810A. Wireless device 810A may further be capable of supporting operation using different TTIs in UL and DL of any one or more of its serving cells.

In the following description, it is assumed that wireless device 810A is configured with at least one serving cell in the UL, referred to herein as "cell1." Although certain example embodiments are described herein for the case when the UE selects between a first transient time (T1) and a second transient time (T2) based on the value of TTI1 or TTI2 used for operation in at least one serving cell (e.g., cell1), the present disclosure is not limited to such an example. Rather, the present disclosure contemplates that the various embodiments described herein are applicable to any suitable scenario involving the selection of a transient time out of any number of transient times based on TTI. In certain embodiments, two cells (or two TTIs or two carriers) may be described when CA is considered. The relevant embodiments are applicable to a CA combination involving more than two TTIs (or cells or carriers), unless otherwise mentioned. The carriers can be inter-band, or intra-band, or a mixture of intra- and inter-band carriers.

According to one example embodiment, a method in a wireless device 810, such as wireless device 810A, is disclosed for determining which transient time to use when different TTI patterns can be used for one wireless device in the same cell. Wireless device 810A obtains a first TTI (TTI1) for operating a first signal (S1) (e.g., between cell1 and wireless device 810A on a first carrier (F1)). As described above, in certain embodiments cell1 is a serving cell of wireless device 810A. Examples of serving cells include PCell, PSCell, SCell, etc. In some cases, cell1 may correspond to an UL serving cell. In such a scenario, TTI1 corresponds to the TTI of the UL serving cell. In certain embodiments, wireless device 810A may also (or instead) obtain a second TTI (TTI2) for operating a second signal (S2) (e.g., between cell1 and wireless device 810A).

As used herein, the term TTI may correspond to any time period (T0) over which a physical channel can be encoded and interleaved for transmission. The physical channel is decoded by the receiver over the same time period (T0) over which it was encoded. The TTI may also be interchangeably referred to as short TTI (sTTI), transmission time, slot, sub-slot, mini-slot, short subframe (SSF), mini-subframe, etc.

As used herein, the term signal can be any physical signal or physical channel. Examples of physical signals are reference signals such as Primary Synchronization Signal (PSS), Secondary Synchronization Signal (SSS), CRS, Positioning Reference Signals (PRS), etc. The term physical channel (e.g., in the context of channel reception) used herein is also referred to as "channel." Examples of physical channels are Master Information Block (MIB), Physical Broadcast Channel (PBCH), Narrowband Physical Broadcast Channel (NPBCH), Physical Downlink Control Channel (PDCCH), Physical Downlink Shared Channel (PDSCH), Short Physical Uplink Control Channel (sPUCCH), Short Physical Downlink Shared Channel (sPDSCH), Short Physical Uplink Shared Channel (sPUSCH), Category M Physical Downlink Control Channel (MPDCCH), Narrowband Physical Downlink Control Channel (NPDCCH), Narrowband Physical Downlink Shared Channel (NPDSCH), Enhanced Physical Downlink Control Channel (E-PDCCH), Physical Uplink Shared Channel (PUSCH), Physical Uplink Control Channel (PUCCH), Narrowband Physical Uplink Shared Channel (NPUSCH), or other suitable channel.

As used herein, operating signals between cell1 and wireless device 810A herein may include wireless device 810A receiving signals from cell1 (e.g., from a network node 815, such as network node 815A) and/or wireless device 810A transmitting signals to cell1 (e.g., to a network node 815, such as network node 815A). Examples of signals that wireless device 810A may receive include DL channels such as PDCCH, PDSCH, sPDCCH, sPDSCH, etc. Examples of signals that wireless device 810A may transmit include UL channels such as PUCCH, PUSCH, sPUCCH, sPUSCH etc.

Wireless device 810A may obtain TTI1 for operating (e.g., transmitting) the first signal and/or TTI2 for operating (e.g., transmitting) the second signal in any suitable manner and based on any suitable criteria. As a first example, in certain embodiments wireless device 810A may obtain TTI1 and/or TTI2 by determining TTI1 and/or TTI2 based on pre-defined information. For example, wireless device 810A may determine TTI1 and/or TTI2 based on a relation between TTI1 and a frequency band of the first carrier F1, and/or a relation between TTI2 and a frequency band of a second carrier (F2).

As a second example, wireless device 810A may obtain TTI1 and/or TTI2 by determining TTI1 and/or TTI2 based on a configuration received from a network node 815, such as network node 815A operating cell1 (e.g., PCell, SCell, SCell etc.). In such a scenario, wireless device 810A may determine a TTI pattern (e.g., 2-OS sTTI, 4-OS sTTI, 1 ms/14-OS TTI, etc.) used in a given time instance in a particular carrier (e.g., F1) based on control signals received in the DL or from a received RRC message.

As a third example, wireless device 810A may obtain TTI1 and/or TTI2 by determining TTI1 and/or TTI2 based on one or more pre-defined rules. The pre-defined rules may take a variety of forms. One example of a predefined rule may be that wireless device 810A should apply the same TTI as used in a reference cell (examples of reference cell include PCell, PSCell, etc.). Another example of a predefined rule may be that wireless device 810A should determine TTI1 and/or TTI2 based on a TTI used in the opposite direction of cell1, such as: assume same TTI in UL and DL of cell1; or assume UL cell1 uses a TTI that is not shorter than the TTI of the DL of cell1.

As a fourth example, wireless device 810A may obtain TTI1 and/or TTI2 using an autonomous determination. For example, wireless device 810A may obtain TTI1 and/or TTI2 using blind detection by wireless device 810A by attempting to decode DL channel of different pre-defined TTIs.

In certain embodiments, wireless device 810A may obtain TTI1 and/or TTI2 using a combination of one or more of the example approaches described above.

Wireless device 810A determines, based on the obtained TTI1, a first transient time parameter (T1) associated with TTI1. In certain embodiments, wireless device 810A also determines, based on the obtained TTI2, a second transient time parameter (T2) associated with TTI2.

As used herein, the term transient time parameter refers to a transient time duration during which the transmit signal changes between ON period and OFF period or the duration during which the signal changes its transmit power level (e.g., from power, P1 to power, P2 or vice versa), or to a value indicative of the transient time duration (such as an index value that corresponds to a transient time duration). The transient time can lie between any sets of time resources (e.g., UL and DL subframes, between any two symbols, between any group of symbols, between any group of slots or subframes, etc.). During the transient time, the UE may not be required to meet any requirement (e.g., such as OFF power limit, ON power limit, transmit power accuracy etc.). The transient time is also interchangeably referred to as ramping time, slew, etc.

As used herein, the term requirement(s) may include any type of wireless device requirements related to wireless device measurements (also referred to as radio requirements, measurement requirements, Radio Resource Management (RRM) requirements, mobility requirements, positioning measurement requirements, etc.). Examples of wireless device requirements related to wireless device measurements are measurement time, measurement reporting time or delay, measurement accuracy (e.g., RSRP/RSRQ accuracy), number of cells to be measured over the measurement time, etc. Examples of measurement time are L1 measurement period, cell identification time or cell search delay, Cell Global Identity (CGI) acquisition delay, etc.

As described in more detail below, wireless device 810A may determine the transient time parameters T1 and/or T2 associated with TTI1 and/or TTI2, respectively, in a variety of ways. In certain embodiments, the determination of the transient time parameters may be done based on TTI duration. In some cases, this may depend on at least the TTI used by wireless device 810A for at least transmitting signals in its serving cell. For example, the transient time parameter T1 associated with TTI1 may be determined based on the duration of TTI1 and/or the transient time parameter T2 associated with TTI2 may be determined based on the duration of TTI2. The parameters T1 and T2 may also be referred to as ramping up time, ramping down time, etc.

In certain embodiments, wireless device 810A supports at least two TTIs (e.g., TTI1 and TTI2) and wireless device 810A can be configured with any of the supported TTIs for operating signals (e.g., S1 and/or S2) on at least one serving cell (e.g., cell1). Each TTI is associated with a transient time parameter. In this case, wireless device 810A, after determining the TTI to be used for operating (e.g., transmitting) signals in the serving cell, determines the transient time parameter that is associated with the determined TTI(s) (e.g., TTI1 and TTI2). The transient time parameter may be determined in a variety of ways.

According to one example embodiment, the transient time parameter (T) is a function of the TTI as expressed below in Equation 1:

$$T=f(TTI) \quad (1)$$

In another example embodiment, the transient time parameter may depend mainly on the TTI used in the UL (TTIu) of the serving cell of wireless device 810A, as expressed below Equation 2:

$$T=f1(TTIu) \quad (2)$$

In yet another example embodiment, the transient time parameter may depend on both the TTI used in the UL (TTIu) and the TTI used in the DL (TTId) of the serving cell of wireless device 810A, as expressed below in Equation 3:

$$T=f2(TTIu,TTId) \quad (3)$$

More specifically, the value T1 and T2 used for transmitting the UL signals S1 and S2, respectively, is a function of TTI used by wireless device 810A in the UL of cell. This is expressed as shown below in Equations 4 and 5:

$$T1=f3(TTI1); \text{ and} \quad (4)$$

$$T2=f4(TTI2) \quad (5)$$

The above expressions can be generalized as expressed below in Equation 6:

$$Tj=f5(TTIj) \quad (6)$$

In yet another example embodiment, the transient time parameter may depend on the TTI as well as the type of signals (Sg) transmitted by wireless device 810A in the serving cell in both the TTI used in the UL (TTIu) and the TTI used in the DL(TTId) of the serving cell of wireless device 810A. Examples of types of signals are Sounding Reference Signal (SRS), DMRS, PUSCH, sPUSCH, PUCCH, sPUCCH, Random Access Channel (RACH), etc. The relation between transient time parameter, TTI and type of signal is expressed below as shown below in Equations 7-9:

$$T=f6(TTI,Sg) \quad (7)$$

$$T=f7(TTIu,Sg) \quad (8)$$

$$T=f8(TTIu,TTId,Sg) \quad (9)$$

According to another example embodiment, wireless device 810A may use a first transient time parameter (T1) for cell1 with TTI1, while wireless device 810A may use a second transient time parameter (T2) for cell1 with TTI2. In certain embodiments, Sg may be the same type of the signal transmitted in TTIu and TTId. In certain embodiments, Sg may be different in TTIu and TTId. For example, Sgu and Sgd are transmitted in TTIu by wireless device 810A and in TTId by network node 815A, respectively. This is expressed as shown below in Equations 10-12:

$$T=f9(TTI,Sgu,Sgd) \quad (10)$$

$$T=f10(TTIu,Sgu,Sgd) \quad (11)$$

$$T=f11(TTIu,TTId,Sgu,Sgd) \quad (12)$$

In yet another example embodiment, the transient time parameter may depend on a group of TTIs. For example, it may depend on whether the transient period occurs after a certain number (M1) of consecutive TTIs and/or before a certain number (M2) of consecutive TTIs, as well as the type of signals (Sg) transmitted by wireless device 810A in the serving cell both the TTI used in the UL (TTIu) and the TTI used in the DL (TTId) of the serving cell or wireless device 810A. Examples of M1 and M2 include 2, 4 and 8.

Examples of types of signals are SRS, DMRS, PUSCH, sPUSCH, PUCCH, sPUCCH, RACH, etc.

The relation between transient time parameter and n number of UL consecutive TTIs (i.e., TTI1u, TTI2u, ...) before or after the transient period is expressed below by the Equation 13:

$$T = f12(TTI1u, TTI2u, \ldots, TTI1nu) \quad (13)$$

The relation between transient time parameter and m number of DL consecutive TTIs (i.e., TTI1d, TTI2d, ...) before or after the transient period is expressed below by the following expression:

$$T = f13(TTI1d, TTI2d, \ldots, TTI1md) \quad (14)$$

The relation between any combination of: transient time parameter and n number of UL consecutive TTIs (i.e., TTI1u, TTI2u, ...) before or after the transient period and m number of DL consecutive TTIs (i.e., TTI1d, TTI2d, ...) before or after the transient period is expressed below by Equation 15:

$$T = f14(TTI1u, TTI2u, \ldots, TTI1nu, TTI1d, TTI2d, \ldots, TTI1md) \quad (15)$$

Another example of the relation between transient time parameter, Sg, n number of UL consecutive TTIs (i.e., TTI1, TTI2u, ...) before or after the transient period is expressed below by Equation 16:

$$T = f16(Sg, TTI1u, TTI2u, \ldots, TTI1nu) \quad (16)$$

The relation between transient time parameter, Sg and m number of DL consecutive TTIs (i.e., TTI1d, TTI2d, ...) before or after the transient period is expressed below by Equation 17:

$$T = f17(Sg, TTI1d, TTI2d, \ldots, TTI1md) \quad (17)$$

The relation between any combination of: Sgu, Sgd, transient time parameter and n number of UL consecutive TTIs (i.e., TTI1u, TTI2u, ...) before or after the transient period and m number of DL consecutive TTIs (i.e., TTI1d, TTI2d, ...) before or after the transient period is expressed below by Equations 18 and 19:

$$T = f18(Sg, TTI1u, TTI2u, \ldots, TTI1nu, TTI1d, TTI2d, \ldots, TTI1md) \quad (18)$$

$$T = f19(Sgu, TTI1u, TTI2u, \ldots, TTI1nu, Sgd, TTI1d, TTI2d, \ldots, TTI1md) \quad (19)$$

Currently, the transient time parameter is defined as 20 µs for 1 ms TTI duration. Certain embodiments described herein adapt this transient time duration according to the shortened TTI duration. That is, for shorter TTIs, the transient time parameter is also reduced (i.e., to define transient time parameter as function of sTTI).

In certain embodiments, wireless device 810A may determine the new transient time parameter based on one or more pre-defined rules, or the rules can be configured at wireless device 810A, for example by a network node 815, such as network node 815A. One example of a pre-defined rule is that the transient time parameter is reduced in a linear fashion for different shortened TTI. Such an example is shown in Tables 2, 2A, and 2B below. Here, a linear scaling is used to determine corresponding transient time parameter.

The table below is valid for the case when a 1 ms TTI consists of 14 OFDM symbols (with normal cyclic prefix length).

TABLE 2

Transient time parameter as function of TTI length based on linear scaling with respect to TTI length.

| TTI length | TTI duration | Transient time parameter |
|---|---|---|
| 14 OS | 1 ms | 20 µs |
| 7 OS | 0.5 ms | 10 µs |
| 4 OS | 285.71 µs | 40/7 µs |
| 2 OS | 142.86 µs | 20/7 µs |

TABLE 2A

Transient time parameter as function of TTI length based on linear scaling with respect to TTI length and type of signal (e.g., SRS in at least one of the DL and UL TTIs).

| TTI length | TTI duration | Transient time parameter |
|---|---|---|
| 14 OS | 1 ms | 20 µs |
| 7 OS | 0.5 ms | 7 µs |
| 4 OS | 285.71 µs | 28/7 µs |
| 2 OS | 142.86 µs | 14/7 µs |

TABLE 2B

Transient time parameter as function of TTI length based on linear scaling with respect to TTI length and type of signal (e.g., PUSCH or sPUSCH in at least one of the DL and UL TTIs).

| TTI length | TTI duration | Transient time parameter |
|---|---|---|
| 14 OS | 1 ms | 20 µs |
| 7 OS | 0.5 ms | 9 µs |
| 4 OS | 285.71 µs | 36/7 µs |
| 2 OS | 142.86 µs | 18/7 µs |

Alternatively, the transient time parameter can be non-linearly scaled as shown in Tables 3, 3A, and 3B below:

TABLE 3

Transient time parameter as function of TTI length based on non-linear scaling with respect to TTI length.

| TTI length | TTI duration | Transient time parameter |
|---|---|---|
| 14 OS | 1 ms | 20 µs |
| 7 OS | 0.5 ms | 12 µs |
| 4 OS | 285.71 µs | 8 µs |
| 2 OS | 142.86 µs | 5 µs |

TABLE 3A

Transient time parameter as function
of TTI length based on non-linear
scaling with respect to TTI length
and type of signal (e.g. SRS in at
least one of the DL and UL TTIs).

| TTI length | TTI duration | Transient time parameter |
|---|---|---|
| 14 OS | 1 ms | 20 μs |
| 7 OS | 0.5 ms | 6 μs |
| 4 OS | 285.71 μs | 30/7 μs |
| 2 OS | 142.86 μs | 15/7 μs |

TABLE 3B

Transient time parameter as function of
TTI length based on non-linear scaling
with respect to TTI length and type of
signal (e.g. PUSCH or sPUSCH in
at least one of the DL and UL TTIs).

| TTI length | TTI duration | Transient time parameter |
|---|---|---|
| 14 OS | 1 ms | 20 μs |
| 7 OS | 0.5 ms | 8 μs |
| 4 OS | 285.71 μs | 35/7 μs |
| 2 OS | 142.86 μs | 17/7 μs |

In the examples of Tables 2, 2A, 2B, 3, 3A, and 3B above, the scaling of the transient time parameter as a function of TTI length is pre-defined. In certain embodiments, the transient time parameter size may be scaled by a scaling factor. In some cases, the scaling factor can be configured by a network node 815, such as network node 815A, at wireless device 810A. The scaling can be linear or non-linear. An example of such an approach is shown below in Table 4. In certain embodiments, the values of K1, K2, K3 and K4 are configurable. As an example, K1 can be 1.

TABLE 4

Transient time parameter
as function of TTI length
based on configurable
scaling factor.

| TTI length | TTI duration | Transient time parameter |
|---|---|---|
| 14 OS | 1 ms | K1*20 μs |
| 7 OS | 0.5 ms | K2*20 μs |
| 4 OS | 285.71 μs | K3*20 μs |
| 2 OS | 142.86 μs | K4*20 μs |

In another example embodiment, the selection of transient time parameters may depend on a threshold value for TTI duration, such that:

$$T1 = f20(TTI > \Delta_{\mu s}); \text{ and} \quad (20)$$

$$T2 = f21(TTI < \Delta_{\mu s}) \quad (21)$$

The above formula can be expressed as the example shown in Table 5 below, if Δ=500 $_{\mu s}$. For example, one transient time parameter can be defined for a set of TTIs of shorter duration and one larger value of Timing Advance (TA) step size can be defined for set of TTIs of longer duration. This is shown below in Table 5:

TABLE 5a

Transient time parameter
as function of TTI length;
same TA adjustment
size for group of TTIs.

| TTI group | TTI length | TTI duration | Transient time parameter |
|---|---|---|---|
| 1 | 14 OS | 1 ms | 20 μs |
|   | 7 OS | 0.5 ms | 20 μs |
| 2 | 4 OS | 285.71 μs | 5 μs |
|   | 2 OS | 142.86 μs | 5 μs |

Another example can be illustrated as shown in Table 5b below, if Δ=1$_{ms}$:

TABLE 5b

Transient time parameter
as function of TTI length;
same TA adjustment size
for group of TTIs.

| TTI group | TTI length | TTI duration | Transient time parameter |
|---|---|---|---|
| 1 | 14 OS | 1 ms | 20 μs |
| 2 | 7 OS | 0.5 ms | 5 μs |
|   | 4 OS | 285.71 μs | 5 μs |
|   | 2 OS | 142.86 μs | 5 μs |

In another example embodiment, wireless device 810A may receive information from a network node 815, such as network node 815A, about the transient time parameter associated with a particular TTI. In yet another example embodiment, two or more mapping tables that map TTI length to transient time parameter can be pre-defined. For example, at least any two of Tables 2, 2A, 2B, 3, 3A, 3B, 4, 5A, 5B described above can be pre-defined. In such a scenario, a network node 815, such as network node 815A, may configure wireless device 810A with any of the pre-defined tables for determining the transient time parameter based on the current TTI used by wireless device 810A.

The table or relation mapping or relating the values of TTI and the corresponding transient time parameters can be obtained by wireless device 815A in any suitable manner. As one example, the table or relation mapping or relating the values of TTI and the corresponding transient time parameters can be obtained based on one or more of the following principles: based on one or more pre-defined rules (e.g., one or more pre-defined requirements in the specification); by receiving it from a network node 815, such as network node 815A, or from another wireless device 810, such as wireless device 815B; By autonomous selection by the UE (e.g., based on historical data or statistics); based on reception performance of UL signals in cell1 (e.g., if received signal quality is below a threshold, then wireless device 810A may adjust its transient time parameter as function of the TTI (i.e., the adjustment may depend on the current TTI)).

In yet another example embodiment, wireless device 810A may decide not to ramp down and ramp up in between two consecutive TTIs, thus deciding on T1 and/or T2 as zero. This may occur provided that one or more of the following is applicable: UL resources are allocated to wireless device 810A for more than one consecutive TTIs; and the exact resource allocation in frequency domain remains the same for consecutive TTIs for wireless device 810A. In the above case, wireless device 810A may choose to follow a different transient time parameter to optimize the useful part of the signal. Although the example transient time parameter above only mentions two consecutive TTIs, the concept is applicable to more than two TTIs.

The number of TTIs for which zero (or any specific value) for transient time parameter can be used can be determined by wireless device 810A using a variety of methods. As one example, wireless device 810A may determine the number of TTIs for which it has consecutive UL resource allocation (and same number of resource blocks are allocated to wireless device 810A for all these consecutive TTIs) from the Uplink Control Information (UCI) that it receives in the DL. As another example, the number of TTIs for which zero (or any specific value) for transient time parameter can be used can also be a pre-defined number, such as a maximum of 3 TTIs (or another suitable number of TTIs). As still another example, the number of TTIs for which zero (or any specific value) for transient time parameter can be used can be determined based on a function that includes the TTI duration. For shorter TTI durations, the maximum allowed consecutive TTIs may be larger compared to larger TTI duration. As yet another example, wireless device 810A may receive this number from the network via any suitable form of network signaling.

Wireless device 810A then transmits signals (S1 and/or S2) to cell1 based on the determined transient time parameter(s) (e.g., T1 and/or T2). In other words, wireless device 810A uses the determined transient time parameters (e.g., T1 and/or T2) associated with the determined values of TTI1 and/or TTI2 for transmitting signals to cell1. For example, in certain embodiments wireless device 810A transmits the first signal (S1) using the determined first transient time (T1). In certain embodiments, wireless device 810A also (or instead) transmits the second signal using the determined second transient time (T2).

By transmitting the first and/or second signals using the determined transient time parameters, wireless device 810A is able to ensure that its ON/OFF behavior in time window follows within the determined transient time values (e.g., T1 and/or T2). The approach described above may advantageously provide well-defined wireless behavior with respect to the transient time parameter for different TTI patterns, including when different TTI patterns are used in consecutive TTIs (and the wireless device is allocated resources in these consecutive TTIs) as well as when different TTI patterns are used in consecutive TTIs and a wireless device 810 is allocated overlapping resources in these consecutive TTIs (such as 4-OS TTI arrangements). Additionally, the transmission of signals by wireless devices 810 configured with the same or different TTIs on different serving cells in CA may advantageously be enhanced.

According to another example embodiment, a method in a network node 815, such as network node 815A, of determining transient time parameter(s) when different TTI patterns can be used for one wireless device 810, such as wireless device 810A, in the same cell is disclosed.

Network node 815A configures a wireless device 810 (e.g., wireless device 810A) with a first TTI (TTI1) used for operating (e.g., transmitting) a first signal (S1) between a first cell (cell1) associated with network node 815A and wireless device 810A. In certain embodiments, network node 810A also configures wireless device 810A with a second TTI (TTI2) used for operating (e.g., transmitting) a second signal (S2) between cell1 and wireless device 810A. The configuration of TTI1 and/or TTI2 may be performed in any suitable manner. As one example, in certain embodiments network node 815A may transmit a message to wireless device 810A (e.g., a RRC message) including the configuration or an indication of the configuration for TTI1 and/or TTI2. In certain embodiments, prior to configuring wireless device 810A, network node 815A may determine the value of TTI1 and/or TTI2. In certain embodiments, prior to configuring wireless device 810A, network node 815A may determine a need to configure TTI1 (i.e., specific value) and/or TTI2 (i.e., specific value).

Network node 815A may determine the value of TTI1 and/or TTI2 in any suitable manner. As one example, network node 815A may determine the TTI1 and/or TTI2 based on the capability of wireless device 810A. For example, network node 815A may determine the value of TTI1 and/or TTI2 based on whether wireless device 810A supports two or more different TTIs (e.g., TTI1=1 ms and TTI2=0.14 ms).

As another example, network node 815A may determine TTI1 and/or TTI2 based on a required bit rate for wireless device 810A. As still another example, network node 815A may determine TTI1 and/or TTI2 based on a round trip time (RTT) required to deliver a data packet between wireless device 810A and network node 815A. For example, a shorter TTI may be used in cases where a shorter RTT is required. As yet another example, network node 815A may determine TTI1 and/or TTI2 based on a location of wireless device 810A with respect to the serving cell. For example, a shorter TTI may be used if wireless device 810A is close to the serving cell (e.g., close to network node 815A serving cell1).

Network node 815A determines, based on the determined value of TTI1, a first transient time parameter (T1) associated with TTI1 that is to be selected or to be used by wireless device 810A for transmitting UL signals. In certain embodiments, network node 815A may also (or instead) determine, based on the determined value of TTI2, a second transient time parameter (T2) associated with TTI2 that is to be selected or to be used by wireless device 810A for transmitting UL signals.

In certain embodiments, network node 815A may determine the value of T1 and/or T2 based on a relation or mapping between TTIs and the transient time parameters. The mapping may contain at least two TTIs and the corresponding two types of the transient time parameters for estimating the corresponding ON/OFF time behavior. In certain embodiments, network node 815A may determine the transient time parameters using the same principles as described above with respect to determining transient time parameters by wireless device 810A. For example, network node 815A may determine the transient time parameters using one or more of equations in relation to Equations 1-19 and Tables 2, 2A, 2B, 3, 3A, 3B, 4, and 5 and the approaches described in relation thereto.

Network node 815A receives signal S1 and/or signal S2 in cell1 from wireless device 810A based on the determined transient time parameter(s). For example, network node 815A receives the first signal transmitted by the wireless device over the configured TTI1 using the determined first transient time T1. In certain embodiments, network node 815A also (or instead) receives the second signal transmitted by wireless device 810A over the configured TTI2 using the determined second transient time T2.

In certain embodiments, network node 815A may adapt its receiver configuration based on the determined transient time parameters (i.e., T1 and/or T2). In certain embodiments, network node 815A may use the received signal and/or the determined transient time parameters for one or more operational tasks. For example, network node 815A may uses the determined transient time parameters over which the signals S1 and/or S2 are transmitted by wireless device 810A for performing one or more operational tasks. Examples of operational tasks include, but are not limited to: performing radio measurements in network node 815A; adapting a TTI of wireless device 810A in DL and/or in UL in cell1; adapting a TTI of wireless device 810A in cell1 in different time resources; power control operation of wireless device 810A in cell1; scheduling of data and/or one or more signals in the UL and/or in the DL of cell1; and adapting a receiver configuration of the network node 815 (e.g., network node 815A) receiving signals from wireless device 810A in cell1.

Figure 9:
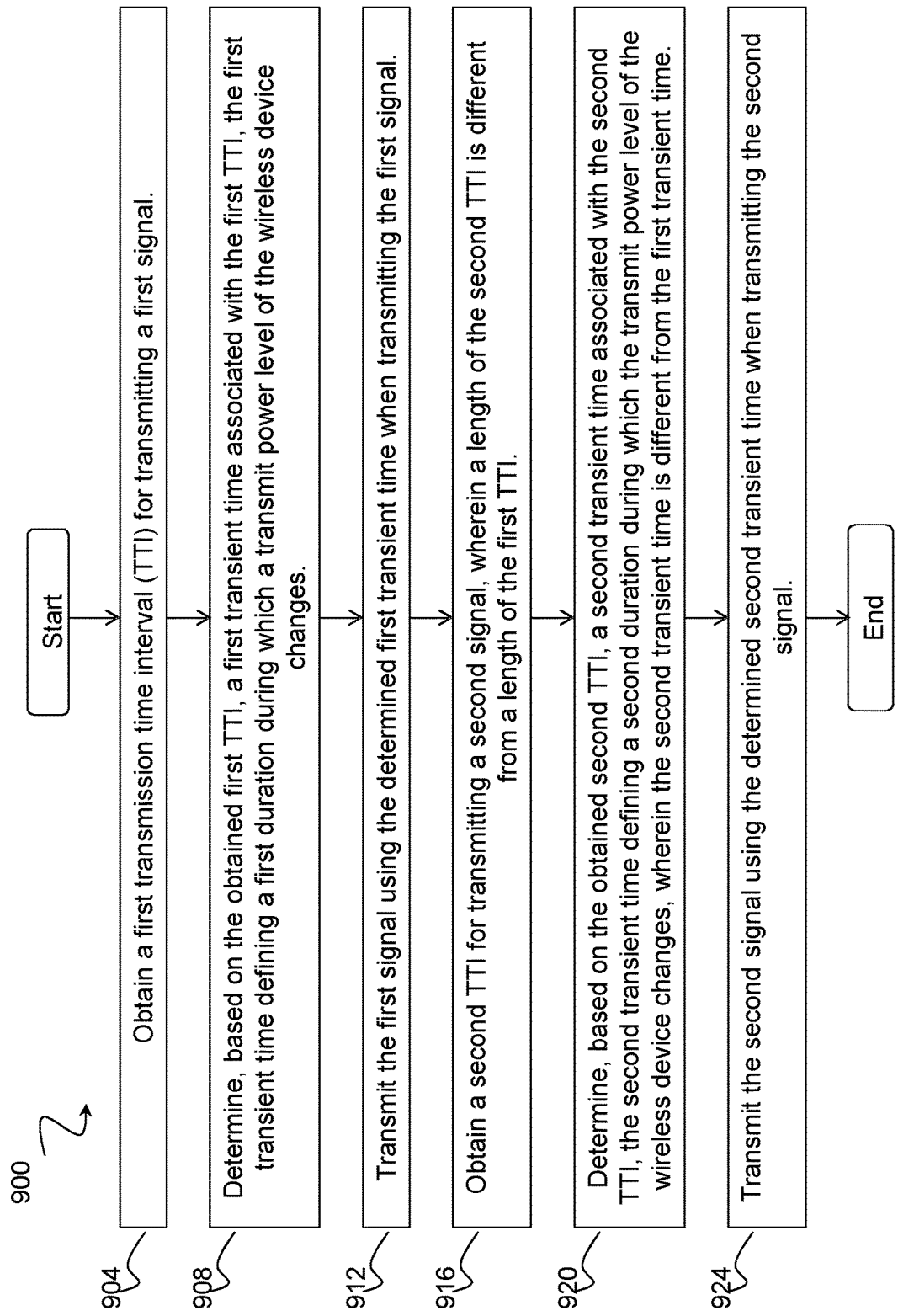
FIG. 9 is a flow diagram of a method in a wireless device, in accordance with certain embodiments.

FIG. 9 is a flow diagram of a method 900 in a wireless device, in accordance with certain embodiments. Method 900 begins at step 904, where the wireless device obtains a first TTI for transmitting a first signal. In certain embodiments, the first TTI may be one of: a sTTI; a transmission time for encoding and interleaving one or more signals; a slot; a sub-slot; a mini-slot; a SSF; and a mini-subframe.

At step 908, the wireless device determines, based on the obtained first TTI, a first transient time associated with the first TTI, the first transient time defining a first duration during which a transmit power level of the wireless device changes. The wireless device may determine the first transient time associated with the first TTI in a variety of ways. In certain embodiments, the wireless device may determine the first transient time associated with the first TTI based on the length of the first TTI. In certain embodiments, the wireless device may determine the first transient time associated with the first TTI using one or more mapping tables. In certain embodiments, the wireless device may determine the first transient time associated with the first TTI based on a scaling factor. In certain embodiments, the wireless device may receive the scaling factor from a network node. In certain embodiments, the wireless device may determine the first transient time associated with the first TTI based on whether the length of the first TTI is above a threshold value.

In certain embodiments, the first transient time associated with the first TTI may be a function of one or more of: the first TTI; a TTI interval used in an uplink of a serving cell of the wireless device; a TTI interval used in a downlink of the serving cell of the wireless device; a type of the first signal; a number of consecutive uplink TTIs before or after a transient period; and a number of consecutive downlink TTIs before or after the transient period.

At step 912, the wireless device transmits the first signal using the determined first transient time when transmitting the first signal.

At step 916, the wireless device obtains a second TTI for transmitting a second signal. wherein a length of the second TTI is different from a length of the first TTI. In certain embodiments, the second TTI may be one of: a sTTI; a transmission time for encoding and interleaving one or more signals; a slot; a sub-slot; a mini-slot; a SSF; and a mini-subframe.

At step 920, the wireless device determines, based on the obtained second TTI, a second transient time associated with the second TTI, the second transient time defining a second duration during which the transmit power level of the wireless device changes, wherein the second transient time is different from the first transient time. The wireless device may determine the second transient time associated with the second TTI in a variety of ways. In certain embodiments, the wireless device may determine the second transient time associated with the second TTI based on the length of the second TTI. In certain embodiments, the wireless device may determine the second transient time associated with the second TTI using one or more mapping tables. In certain embodiments, the wireless device may determine the first transient time associated with the first TTI based on a scaling factor. In certain embodiments, the wireless device may receive the scaling factor from a network node. In certain embodiments, the wireless device may determine the second transient time associated with the second TTI based on whether the length of the second TTI is above the threshold value.

In certain embodiments, the second transient time associated with the second TTI may be a function of one or more of: the second TTI; a TTI interval used in an uplink of a serving cell of the wireless device; a TTI interval used in a downlink of the serving cell of the wireless device; a type of the second signal; a number of consecutive uplink TTIs before or after a transient period; and a number of consecutive downlink TTIs before or after the transient period.

In certain embodiments, the length of the second TTI may be shorter than the length of the first TTI. In certain embodiments, a duration of the first transient time and a duration of the second transient time may be linearly scaled with respect to TTI length according to one or more predefined rules, such that the duration of the second transient time associated with the second TTI is shorter than the duration of the first transient time associated with the first TTI. In certain embodiments, a duration of the first transient time and a duration of the second transient time may be non-linearly scaled with respect to TTI length according to one or more predefined rules, such that the duration of the second transient time associated with the second TTI is shorter than the duration of the first transient time associated with the first TTI.

At step 924, the wireless device transmits the second signal using the determined second transient time when transmitting the second signal.

Figure 10:
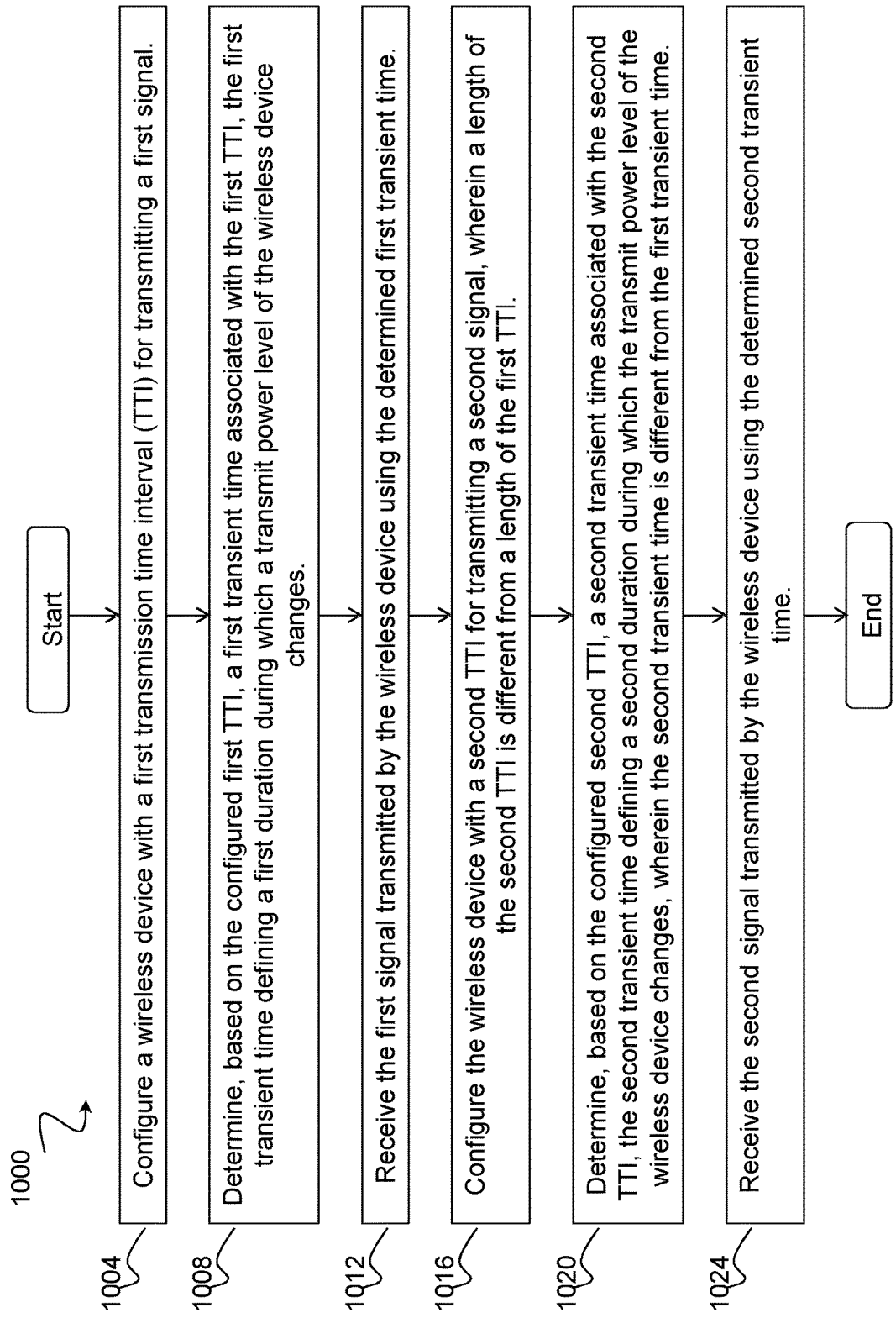
FIG. 10 is a flow diagram of a method in a network node, in accordance with certain embodiments.

FIG. 10 is a flow diagram of a method 1000 in a network node, in accordance with certain embodiments. Method 1000 begins at step 1004, where the network node configures a wireless device with a first TTI for transmitting a first signal. In certain embodiments, the first TTI may be one of: a sTTI; a transmission time for encoding and interleaving one or more signals; a slot; a sub-slot; a mini-slot; a SSF; and a mini-subframe.

In certain embodiments, the network node may determine the first TTI based on one or more of: a capability of the wireless device; a required bit rate of the wireless device; a round trip time required to deliver data between the wireless device and the network node; and a location of the wireless device.

At step 1008, the network node determines, based on the configured first TTI, a first transient time associated with the first TTI, the first transient time defining a first duration during which a transmit power level of the wireless device changes. The network node may determine the first transient time associated with the first TTI in a variety of ways. In certain embodiments, the network node may determine the first transient time associated with the first TTI based on the length of the first TTI. In certain embodiments, the network node may determine the first transient time associated with the first TTI using one or more mapping tables. In certain embodiments, the wireless device may determine the first transient time associated with the first TTI further based on a scaling factor. In certain embodiments, the network node may send the scaling factor to the wireless device. In certain embodiments, the network node may determine the first transient time associated with the first TTI based on whether the length of the first TTI is above a threshold value.

In certain embodiments, the first transient time associated with the first TTI may be a function of one or more of: the first TTI; a TTI interval used in an uplink of a serving cell of the wireless device; a TTI interval used in a downlink of the serving cell of the wireless device; a type of the first signal; a number of consecutive uplink TTIs before or after a transient period; and a number of consecutive downlink TTIs before or after the transient period.

At step 1012, the network node receives the first signal transmitted by the wireless device using the determined first transient time.

At step 1016, the network node configures the wireless device with a second TTI for transmitting a second signal, wherein a length of the second TTI is different from a length of the first TTI. In certain embodiments, the second TTI may be one of: a sTTI; a transmission time for encoding and interleaving one or more signals; a slot; a sub-slot; a mini-slot; a SSF; and a mini-subframe.

In certain embodiments, the network node may determine the second TTI based on one or more of: a capability of the wireless device; a required bit rate of the wireless device; a round trip time required to deliver data between the wireless device and the network node; and a location of the wireless device.

At step 1020, the network node determines, based on the configured second TTI, a second transient time associated with the second TTI, the second transient time defining a second duration during which the transmit power level of the wireless device changes, wherein the second transient time is different from the first transient time. The network node may determine the second transient time associated with the second TTI in a variety of ways. In certain embodiments, the network node may determine the second transient time associated with the second TTI based on the length of the second TTI. In certain embodiments, the network node may determine the second transient time associated with the second TTI using one or more mapping tables. In certain embodiments, the wireless device may determine the second transient time associated with the second TTI further based on a scaling factor. In certain embodiments, the network node may send the scaling factor to the wireless device. In certain embodiments, the network node may determine the second transient time associated with the second TTI based on whether the length of the second TTI is above the threshold value.

In certain embodiments, the second transient time associated with the second TTI may be a function of one or more of: the second TTI; a TTI interval used in an uplink of a serving cell of the wireless device; a TTI interval used in a downlink of the serving cell of the wireless device; a type of the second signal; a number of consecutive uplink TTIs before or after a transient period; and a number of consecutive downlink TTIs before or after the transient period.

In certain embodiments, the length of the second TTI may be shorter than the length of the first TTI. In certain embodiments, a duration of the first transient time and a duration of the second transient time are linearly scaled with respect to TTI length according to one or more predefined rules, such that the duration of the second transient time associated with the second TTI is shorter than the duration of the first transient time associated with the first TTI. In certain embodiments, a duration of the first transient time and a duration of the second transient time are non-linearly scaled with respect to TTI length according to one or more predefined rules, such that the duration of the second transient time associated with the second TTI is shorter than the duration of the first transient time associated with the first TTI.

At step 1024, the network node receives the second signal transmitted by the wireless device using the determined second transient time.

In certain embodiments, the network node may use at least one of the determined first transient time and the determined second transient time for one or more operational tasks. The one or more operational tasks may include one or more of: performing one or more radio measurements; adapting a TTI of the wireless device; performing power control operation of the wireless device in the first cell; scheduling of one or more of data and signals in the first cell; and adapting a receiver configuration of the network node for receiving signals from the wireless device in the first cell.

Figure 11:
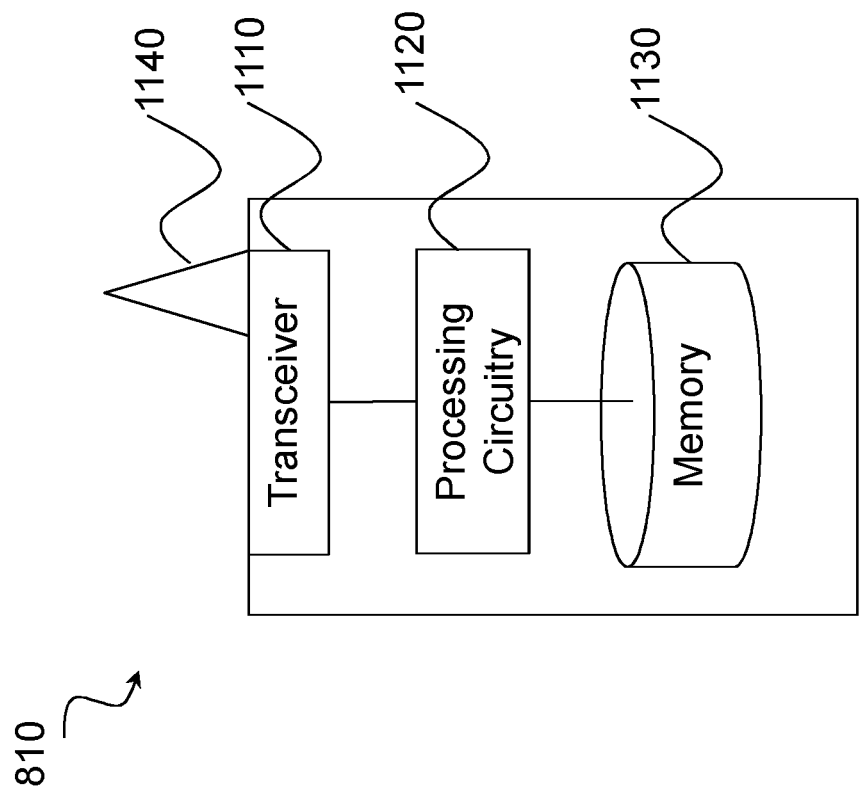
FIG. 11 is a block schematic of an exemplary wireless device, in accordance with certain embodiments.

FIG. 11 is a block schematic of an exemplary wireless device 810, in accordance with certain embodiments. Wireless device 810 may refer to any type of wireless device communicating with a node and/or with another wireless device in a cellular or mobile communication system. Examples of wireless device 810 include a mobile phone, a smart phone, a PDA, a portable computer (e.g., laptop, tablet), a sensor, an actuator, a modem, an MTC device/M2M device, LEE, LME, USB dongles, a D2D capable device, or another device that can provide wireless communication. A wireless device 810 may also be referred to as UE, a station (STA), a device, or a terminal in some embodiments. Wireless device 810 includes transceiver 1110, processing circuitry 1120, and memory 1130. In some embodiments, transceiver 1110 facilitates transmitting wireless signals to and receiving wireless signals from network node 815 (e.g., via antenna 1140), processing circuitry 1120 executes instructions to provide some or all of the functionality described above as being provided by wireless device 810, and memory 1130 stores the instructions executed by processing circuitry 1120.

Processing circuitry 1120 may include any suitable combination of hardware and software implemented in one or more modules to execute instructions and manipulate data to perform some or all of the described functions of wireless device 810, such as the functions of wireless device 810 described above in relation to FIGS. 1-10. In some embodiments, processing circuitry 1120 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 1130 is generally operable to store instructions, such as a computer program, software, an application including one or more of logic, rules, algorithms, code, tables, etc. and/or other instructions capable of being executed by processing circuitry 1120. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 1120.

Other embodiments of wireless device 810 may include additional components beyond those shown in FIG. 11 that may be responsible for providing certain aspects of the wireless device's functionality, including any of the functionality described above and/or any additional functionality (including any functionality necessary to support the solution described above). As just one example, wireless device 810 may include input devices and circuits, output devices, and one or more synchronization units or circuits, which may be part of the processing circuitry 1120. Input devices include mechanisms for entry of data into wireless device 810. For example, input devices may include input mechanisms, such as a microphone, input elements, a display, etc. Output devices may include mechanisms for outputting data in audio, video and/or hard copy format. For example, output devices may include a speaker, a display, etc.

Figure 12:
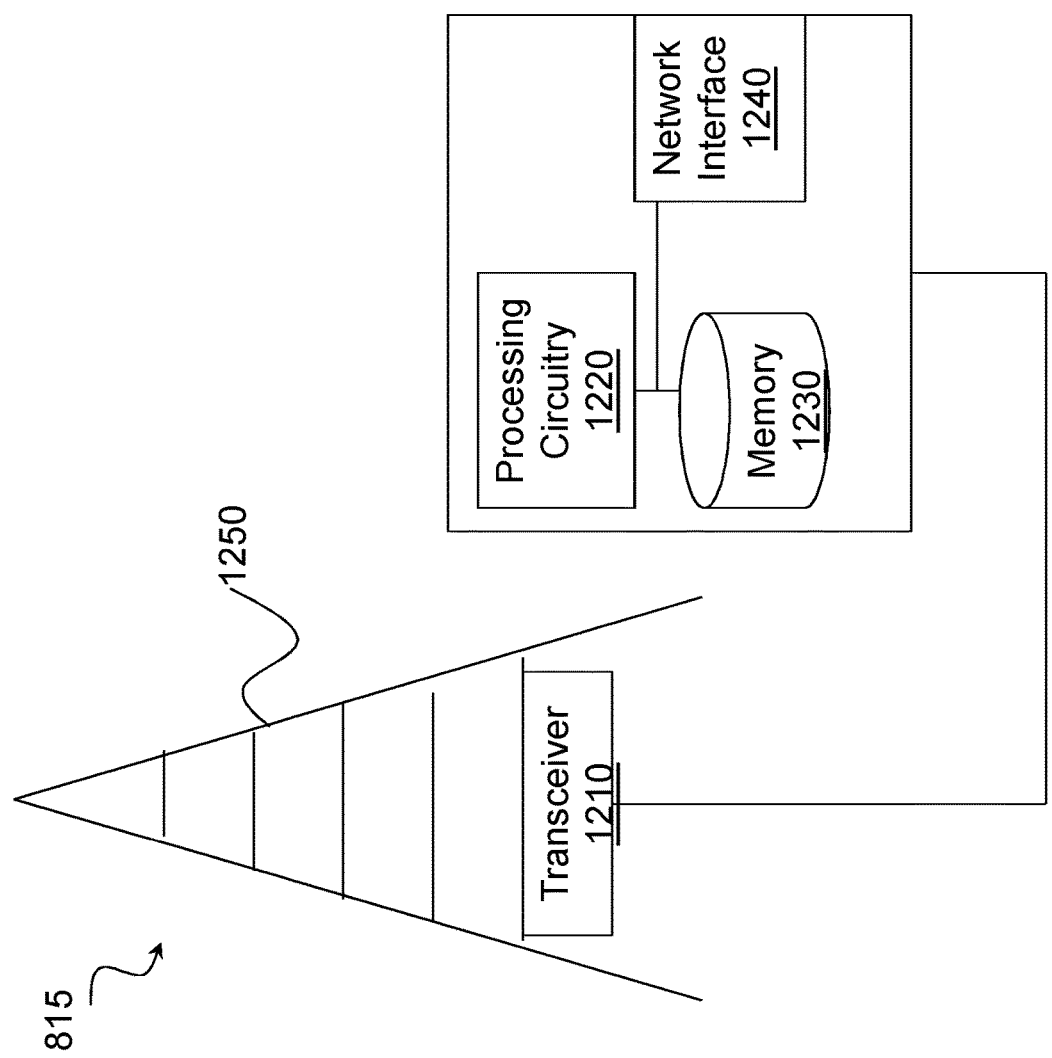
FIG. 12 is a block schematic of an exemplary network node, in accordance with certain embodiments.

FIG. 12 is a block schematic of an exemplary network node 815, in accordance with certain embodiments. Network node 815 may be any type of radio network node or any network node that communicates with a UE and/or with another network node. Examples of network node 815 include an eNB, a node B, a BS, a wireless AP (e.g., a Wi-Fi AP), a low power node, a BTS, relay, donor node controlling relay, transmission points, transmission nodes, RRU, RRH, MSR radio node such as MSR BS, nodes in DAS, O&M, OSS, SON, positioning node (e.g., E-SMLC), MDT, or any other suitable network node. Network nodes 815 may be deployed throughout a network as a homogenous deployment, heterogeneous deployment, or mixed deployment. A homogeneous deployment may generally describe a deployment made up of the same (or similar) type of network nodes 815 and/or similar coverage and cell sizes and inter-site distances. A heterogeneous deployment may generally describe deployments using a variety of types of network nodes 815 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 815 may include one or more of transceiver 1210, processing circuitry 1220, memory 1230, and network interface 1240. In some embodiments, transceiver 1210 facilitates transmitting wireless signals to and receiving wireless signals from wireless device 810 (e.g., via antenna 1250), processing circuitry 1220 executes instructions to provide some or all of the functionality described above as being provided by a network node 815, memory 1230 stores the instructions executed by processing circuitry 1220, and network interface 1240 communicates signals to backend network components, such as a gateway, switch, router, Internet, Public Switched Telephone Network (PSTN), core network nodes or radio network controllers 130, etc.

Processing circuitry 1220 may include any suitable combination of hardware and software implemented in one or more modules to execute instructions and manipulate data to perform some or all of the described functions of network node 815, such as those described above in relation to FIGS. 1-10. In some embodiments, processing circuitry 1220 may include, for example, one or more computers, one or more CPUs, one or more microprocessors, one or more applications, one or more ASICs, one or more FPGAs, and/or other logic.

Memory 1230 is generally operable to store instructions, such as a computer program, software, an application including one or more of logic, rules, algorithms, code, tables, etc. and/or other instructions capable of being executed by processing circuitry 1220. Examples of memory 1230 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 1240 is communicatively coupled to processing circuitry 1220 and may refer to any suitable device operable to receive input for network node 815, send output from network node 815, perform suitable processing of the input or output or both, communicate to other devices, or any combination of the preceding. Network interface 1240 may include appropriate hardware (e.g., port, modem, network interface card, etc.) and software, including protocol conversion and data processing capabilities, to communicate through a network.

Other embodiments of network node 815 may include additional components beyond those shown in FIG. 12 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 13:
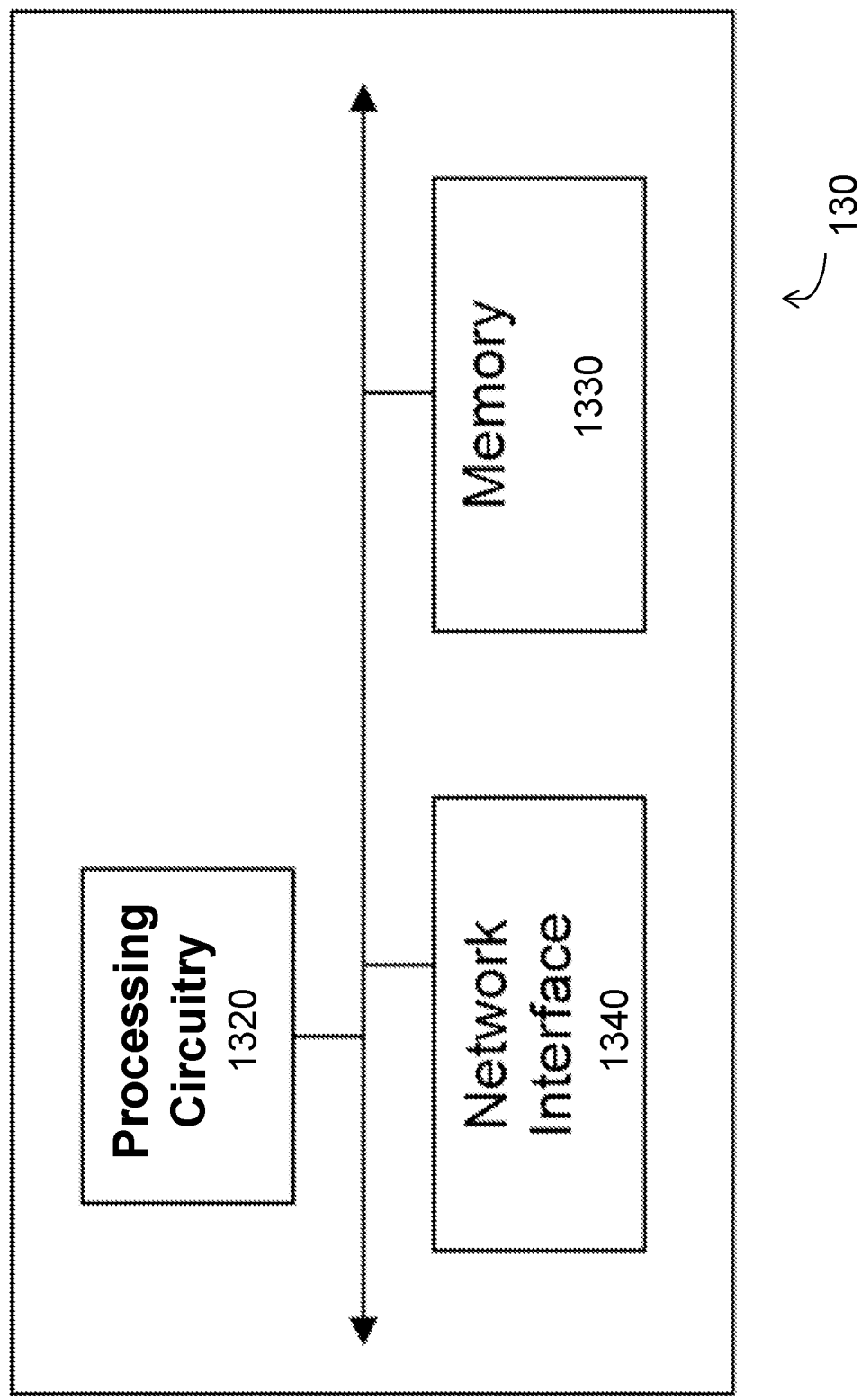
FIG. 13 is a block schematic of an exemplary radio network controller or core network node, in accordance with certain embodiments.

FIG. 13 is a block schematic of an exemplary RNC or core network node 130, in accordance with certain embodiments. Examples of network nodes can include a MSC, a serving GPRS support node (SGSN), an MME, an RNC, a BSC, and so on. The RNC or core network node 130 includes processing circuitry 1320, memory 1330, and network interface 1340. In some embodiments, processing circuitry 1320 executes instructions to provide some or all of the functionality described above as being provided by the network node, memory 1330 stores the instructions executed by processing circuitry 1320, and network interface 1340 communicates signals to any suitable node, such as a gateway, switch, router, Internet, PSTN, network nodes 815, RNCs or core network nodes 130, etc.

Processing circuitry 1320 may include any suitable combination of hardware and software implemented in one or more modules to execute instructions and manipulate data to perform some or all of the described functions of the radio network controller or core network node 130. In some embodiments, processing circuitry 1320 may include, for example, one or more computers, one or more CPUs, one or more microprocessors, one or more applications, one or more ASICs, one or more FPGAs and/or other logic.

Memory 1330 is generally operable to store instructions, such as a computer program, software, an application including one or more of logic, rules, algorithms, code, tables, etc. and/or other instructions capable of being executed by processing circuitry 1320. Examples of memory 1330 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 1340 is communicatively coupled to processing circuitry 1320 and may refer to any suitable device operable to receive input for the network node, send output from the network node, perform suitable processing of the input or output or both, communicate to other devices, or any combination of the preceding. Network interface 1340 may include appropriate hardware (e.g., port, modem, network interface card, etc.) and software, including protocol conversion and data processing capabilities, to communicate through a network.

Other embodiments of the network node may include additional components beyond those shown in FIG. 13 that may be responsible for providing certain aspects of the network node's functionality, including any of the functionality described above and/or any additional functionality (including any functionality necessary to support the solution described above).

Figure 14:
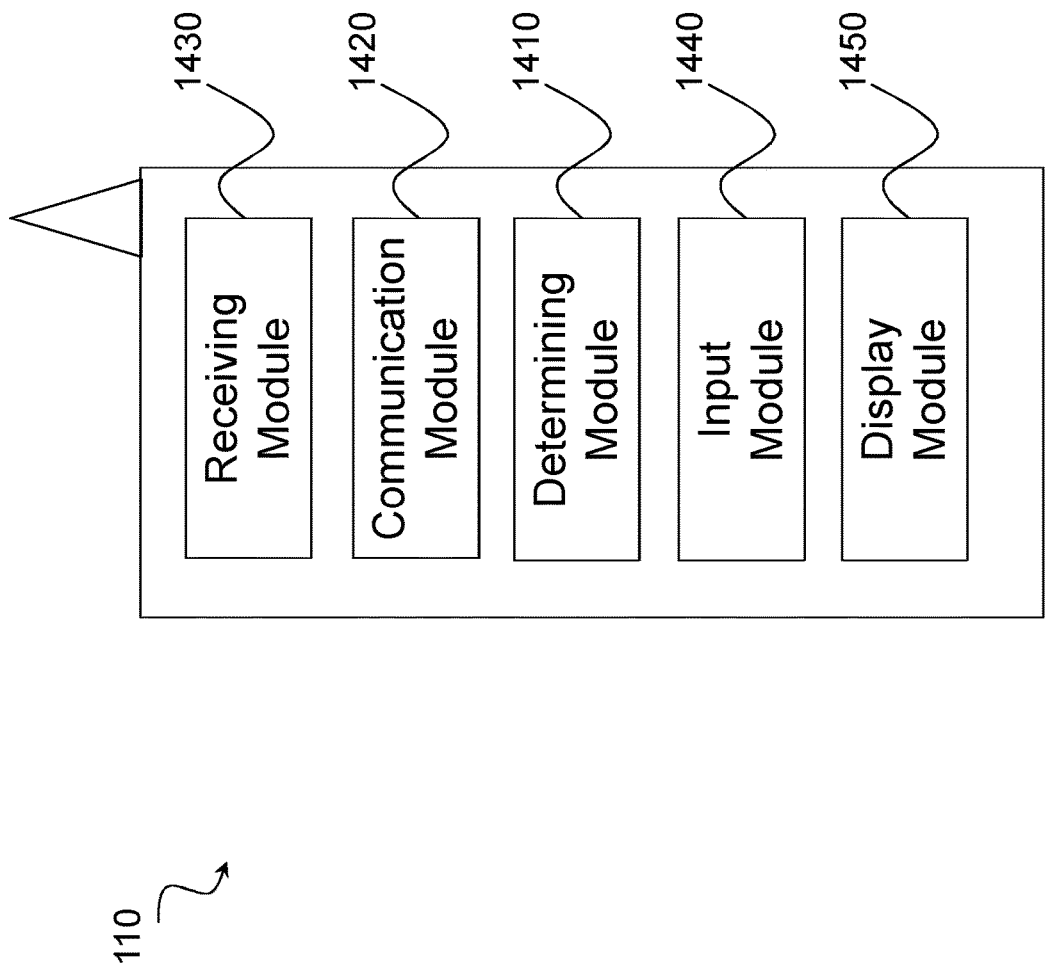
FIG. 14 is a block schematic of an exemplary wireless device, in accordance with certain embodiments.

FIG. 14 is a schematic block diagram of an exemplary wireless device, in accordance with certain embodiments. Wireless device 810 may include one or more modules. For example, wireless device 810 may include a determining module 1410, a communication module 1420, a receiving module 1430, an input module 1440, a display module 1450, and any other suitable modules. In some embodiments, one or more of determining module 1410, communication module 1420, receiving module 1430, input module 1440, display module 1450, or any other suitable module may be implemented using one or more processors, such as processing circuitry 1120 described above in relation to FIG. 11. In certain embodiments, the functions of two or more of the various modules may be combined into a single module. Wireless device 810 may perform the methods for adapting UE ON/OFF transient time parameter for different TTI patterns described above with respect to FIGS. 1-10.

Determining module 1410 may perform the processing functions of wireless device 810. As one example, determining module 1410 may obtain a first TTI for transmitting a first signal. As another example, determining module 1410 may determine, based on the obtained first TTI, a first transient time associated with the first TTI, the first transient time defining a first duration during which a transmit power level of the wireless device changes. In certain embodiments, determining module 1410 may determine the first transient time associated with the first TTI based on the length of the first TTI. In certain embodiments, determining module 1410 may determine the first transient time associated with the first TTI based on whether the length of the first TTI is above a threshold value.

As still another example, determining module 1410 may obtain a second TTI for transmitting a second signal (in some cases, a length of the second TTI is different from a length of the first TTI). As yet another example, determining module 1410 may determine, based on the obtained second TTI, a second transient time associated with the second TTI, the second transient time defining a second duration during which the transmit power level of the wireless device changes (in some cases, the second transient time may be different from the first transient time). In certain embodiments, determining module 1410 may determine the second transient time associated with the second TTI based on the length of the second TTI. In certain embodiments, determining module 1410 may determine the second transient time associated with the second TTI based on whether the length of the second TTI is above a threshold value.

As another example, determining module 1410 may determine at least one of the first transient time associated with the first TTI and the second transient time associated with the second TTI using one or more mapping tables. As another example, determining module 1410 may determine at least one of the first transient time associated with the first TTI and the second transient time associated with the second TTI based on a scaling factor.

Determining module 1410 may include or be included in one or more processors, such as processing circuitry 1120 described above in relation to FIG. 11. Determining module 1410 may include analog and/or digital circuitry configured to perform any of the functions of determining module 1410 and/or processing circuitry 1120 described above. The functions of determining module 1410 described above may, in certain embodiments, be performed in one or more distinct modules.

Communication module 1420 may perform the transmission functions of wireless device 810. As one example, communication module 1420 may transmit the first signal using the determined first transient time when transmitting the first signal. As another example, communication module 1420 may transmit the second signal using the determined second transient time when transmitting the second signal.

Communication module 1420 may include a transmitter and/or a transceiver, such as transceiver 1110 described above in relation to FIG. 11. Communication module 1420 may include circuitry configured to wirelessly transmit messages and/or signals. In particular embodiments, communication module 1420 may receive messages and/or signals for transmission from determining module 1410. In certain embodiments, the functions of communication module 1420 described above may be performed in one or more distinct modules.

Receiving module 1430 may perform the receiving functions of wireless device 810. As one example, receiving module 1430 may obtain a first TTI for transmitting a first signal. As another example, receiving module 1430 may obtain a second TTI for transmitting a second signal (in some cases, a length of the second TTI is different from a length of the first TTI). As still another example, receiving module 1430 may receive one or more scaling factors from a network node.

Receiving module 1430 may include a receiver and/or a transceiver. Receiving module 1430 may include a receiver and/or a transceiver, such as transceiver 1110 described above in relation to FIG. 11. Receiving module 1430 may include circuitry configured to wirelessly receive messages and/or signals. In particular embodiments, receiving module 1430 may communicate received messages and/or signals to determining module 1410. The functions of receiving module 1430 described above may, in certain embodiments, be performed in one or more distinct modules.

Input module 1440 may receive user input intended for wireless device 810. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1410. The functions of input module 1440 described above may, in certain embodiments, be performed in one or more distinct modules.

Display module 1450 may present signals on a display of wireless device 810. Display module 1450 may include the display and/or any appropriate circuitry and hardware configured to present signals on the display. Display module 1450 may receive signals to present on the display from determining module 1410. The functions of display module 1450 described above may, in certain embodiments, be performed in one or more distinct modules.

Determining module 1410, communication module 1420, receiving module 1430, input module 1440, and display module 1450 may include any suitable configuration of hardware and/or software. Wireless device 810 may include additional modules beyond those shown in FIG. 14 that may be responsible for providing any suitable functionality, including any of the functionality described above and/or any additional functionality (including any functionality necessary to support the various solutions described herein).

Figure 15:
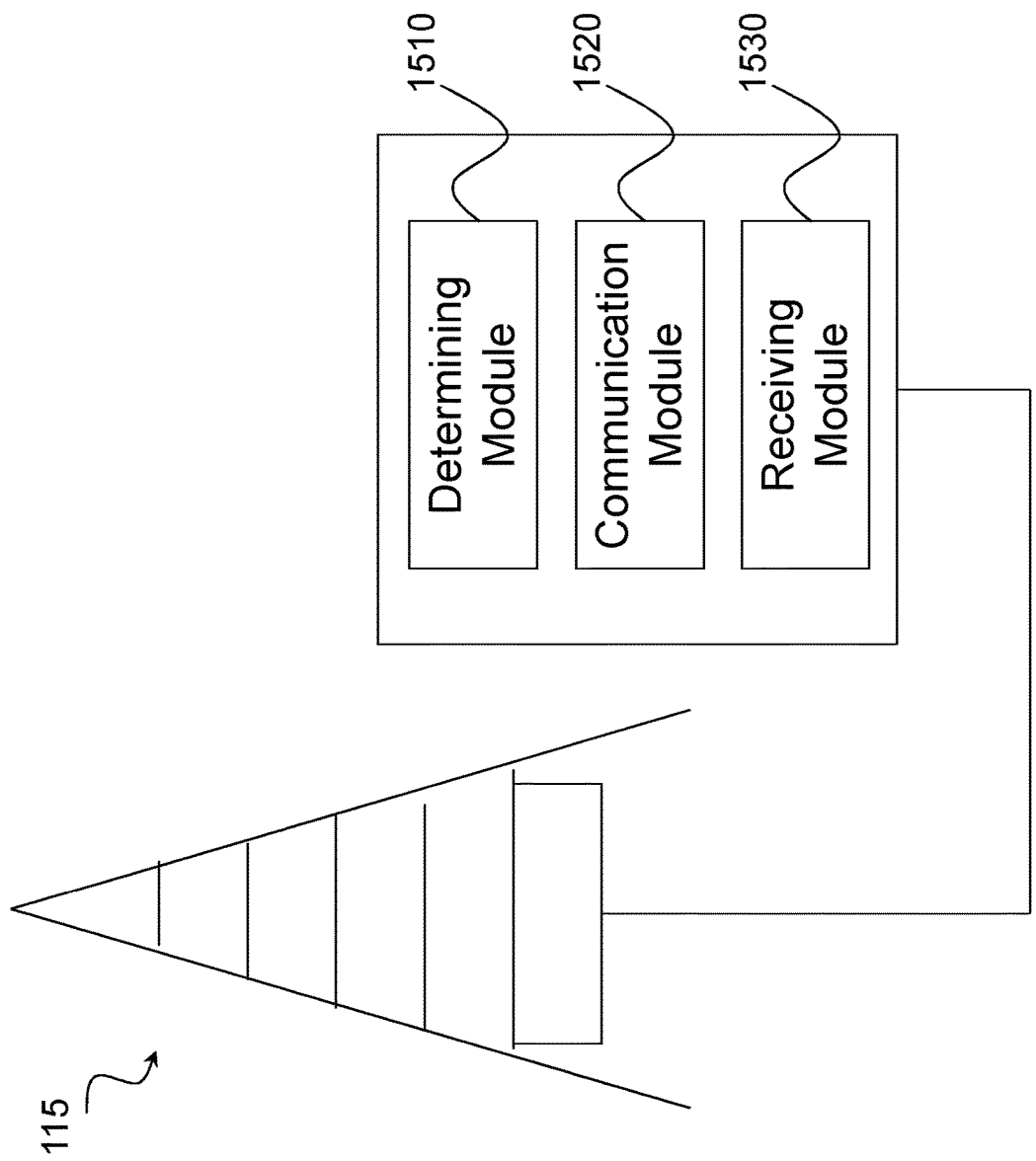
FIG. 15 is a block schematic of an exemplary network node, in accordance with certain embodiments.

FIG. 15 is a schematic block diagram of an exemplary network node 815, in accordance with certain embodiments. Network node 815 may include one or more modules. For example, network node 815 may include determining module 1510, communication module 1520, receiving module 1530, and any other suitable modules. In some embodiments, one or more of determining module 1510, communication module 1520, receiving module 1530, or any other suitable module may be implemented using one or more processors, such as processing circuitry 1220 described above in relation to FIG. 12. In certain embodiments, the functions of two or more of the various modules may be combined into a single module. Network node 815 may perform the methods for adapting UE ON/OFF transient time parameter for different TTI patterns described above with respect to FIGS. 1-10.

Determining module 1510 may perform the processing functions of network node 815. As one example, determining module 1510 may configure a wireless device with a first TTI for transmitting a first signal. As another example, determining module 1510 may determine, based on the configured first TTI, a first transient time associated with the first TTI, the first transient time defining a first duration during which a transmit power level of the wireless device changes. In certain embodiments, determining module 1510 may determine the first transient time associated with the first TTI based on the length of the first TTI. In certain embodiments, determining module 1510 may determine the first transient time associated with the first TTI based on whether the length of the first TTI is above a threshold value.

As still another example, determining module 1510 may configure the wireless device with a second TTI for transmitting a second signal (in some cases, a length of the second TTI may be different from a length of the first TTI). As yet another example, determining module 1510 may determine, based on the configured second TTI, a second transient time associated with the second TTI, the second transient time defining a second duration during which the transmit power level of the wireless device changes (in some cases, the second transient time may be different from the first transient time). In certain embodiments, determining module 1510 may determine the second transient time associated with the second TTI based on the length of the second TTI. In certain embodiments, determining module 1510 may determine the second transient time associated with the second TTI based on whether the length of the second TTI is above the threshold value.

As another example, determining module 1510 may determine at least one of the first TTI and the second TTI based on one or more of: a capability of the wireless device; a required bit rate of the wireless device; a RTT required to deliver data between the wireless device and the network node; and a location of the wireless device. As another example, determining module 1510 may determine at least one of the first transient time associated with the first TTI and the second transient time associated with the second TTI using one or more mapping tables. As another example, determining module 1510 may determine at least one of the first transient time associated with the first TTI and the second transient time associated with the second TTI are based on a scaling factor.

As another example, determining module 1510 may use at least one of the determined first transient time and the determined second transient time for one or more operational tasks. In certain embodiments, the one or more operational tasks may include one or more of: performing one or more radio measurements; adapting a TTI of the wireless device; performing power control operation of the wireless device in the first cell; scheduling of one or more of data and signals in the first cell; and adapting a receiver configuration of the network node for receiving signals from the wireless device in the first cell.

Determining module 1510 may include or be included in one or more processors, such as processing circuitry 1220 described above in relation to FIG. 12. Determining module 1510 may include analog and/or digital circuitry configured to perform any of the functions of determining module 1510 and/or processing circuitry 1220 described above. The functions of determining module 1510 may, in certain embodiments, be performed in one or more distinct modules.

Communication module 1520 may perform the transmission functions of network node 815. As one example, communication module 1520 may (in conjunction with determining module 1520) configure a wireless device with a first TTI for transmitting a first signal (e.g., by sending a configuration to the wireless device). As still another example, communication module 1520 (in conjunction with determining module 1520) may configure the wireless device with a second TTI for transmitting a second signal (e.g., by sending a configuration to the wireless device). As one example, communication module 1520 may send one or more scaling factors to the wireless device.

Communication module 1520 may transmit messages to one or more of wireless devices 810. Communication module 1520 may include a transmitter and/or a transceiver, such as transceiver 1210 described above in relation to FIG. 12. Communication module 1520 may include circuitry configured to wirelessly transmit messages and/or signals. In particular embodiments, communication module 1520 may receive messages and/or signals for transmission from determining module 1510 or any other module. The functions of communication module 1520 may, in certain embodiments, be performed in one or more distinct modules.

Receiving module 1530 may perform the receiving functions of network node 815. As one example, receiving module 1530 may receive the first signal transmitted by the wireless device using the determined first transient time. As another example, receiving module 1530 may receive the second signal transmitted by the wireless device using the determined second transient time.

Receiving module 1530 may receive any suitable information from a wireless device. Receiving module 1530 may include a receiver and/or a transceiver, such as transceiver 1210 described above in relation to FIG. 12. Receiving module 1530 may include circuitry configured to wirelessly receive messages and/or signals. In particular embodiments, receiving module 1530 may communicate received messages and/or signals to determining module 1510 or any other suitable module. The functions of receiving module 1530 may, in certain embodiments, be performed in one or more distinct modules.

Determining module 1510, communication module 1520, and receiving module 1530 may include any suitable configuration of hardware and/or software. Network node 815 may include additional modules beyond those shown in FIG. 15 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3GPP Third Generation Partnership Project
ACK Acknowledgement
AP Access Point
ASIC Application Specific Integrated Circuit
BLER Block Error Rate
BS Base Station
BSC Base Station Controller
BTS Base Transceiver Station
CA Carrier Aggregation
CC Component Carrier
CD Compact Disk
CFI Control Format Indicator
CGI Cell Global Identity
CPE Customer Premises Equipment
CPU Central Processing Unit
CQI Channel Quality Indicator
CSI Channel State Information
CSI-RS Channel State Information Reference Signal
CRS Common Reference Symbols
D2D Device-to-device
DAS Distributed Antenna System
DCI Downlink Control Information
DFT Discrete Fourier Transform
DL Downlink
DMRS Demodulation Reference Signal
DVD Digital Video Disk
eNB evolved Node B
E-PDCCH Enhanced Physical Downlink Control Channel
E-SMLC Evolved-Serving Mobile Location Center
FDD Frequency Division Duplex
FPGA Field Programmable Gate Array
FS Frame Structure
gNB gNodeB
GPRS General Packet Radio Service
HARQ Hybrid Automatic Repeat Request
HTTP Hypertext Transfer Protocol
LAN Local Area Network
LEE Laptop Embedded Equipment
LME Laptop Mounted Equipment
LTE Long Term Evolution
M2M Machine-to-Machine
MAN Metropolitan Area Network
MCE Multi-cell/multicast Coordination Entity
MCS Modulation level and coding scheme
MDT Minimization of Drive Test
MeNB Master eNB
MIB Master Information Block
MME Mobility Management Entity
MPDCCH Category M Physical Downlink Control Channel
MSC Mobile Switching Center
MSR Multi-Standard Radio
MTC Machine-Type Communication
NACK Negative Acknowledgement
NAS Non-Access Stratum
NB-IoT Narrowband Internet-of-Things
NPBCH Narrowband Physical Broadcast Channel
NPDCCH Narrowband Physical Downlink Control Channel
NPDSCH Narrowband Physical Downlink Shared Channel
NPUSCH Narrowband Physical Uplink Shared Channel
NR New Radio
OFDM Orthogonal Frequency Division Multiplexing
O&M Operations & Management
OSS Operations Support System
PBCH Physical Broadcast Channel
PCC Primary Component Carrier
PCell Primary Cell
PCFICH Physical Control Format Indicator Channel
PDCCH Physical Downlink Control Channel
PDSCH Physical Downlink Shared Channel
PHICH Physical HARQ Indication Channel
PRB Physical Resource Block
PRS Positioning Reference Signal
PSCell Primary Secondary Cell
PSS Primary Synchronization Signal
PSTN Public Switched Telephone Network
PUSCH Physical Uplink Shared Channel
PUCCH Physical Uplink Control Channel
RACH Random Access Channel
RAM Random Access Memory
RAN Radio Access Network
RAT Radio Access Technology
RB Resource Block
RI Rank Indicator
RNC Radio Network Controller
ROM Read-Only Memory
RRC Radio Resource Control
RRH Remote Radio Head
RRM Radio Resource Management
RRU Remote Radio Unit
RSRP Reference Signal Received Power
RSRQ Reference Signal Received Quality
SCC Secondary Component Carrier
SCell Secondary Cell
SC-FDMA Single-Carrier Frequency Division Multiple Access
SeNB Secondary eNB
SGSN Serving GPRS Support Node
SON Self-Organizing Network
sPUCCH Short Physical Uplink Control Channel
sPDSCH Short Physical Downlink Shared Channel
sPUSCH Short Physical Uplink Shared Channel
SRS Sounding Reference Signal
SSF Short Subframe
SSS Secondary Synchronization Signal
STA Station
sTTI Short Transmission Time Interval
TA Timing Advance
TCP Transmission Control Protocol TDD Time Division Duplex
TFRE Time Frequency Resource Element
TM Transmission Mode
TTI Transmission Time Interval
UCI Uplink Control Information
UE User Equipment
UL Uplink
WAN Wide Area Network

The invention claimed is:

1. A method in a wireless device, comprising:
obtaining, from a network node, a first transmission time interval (TTI) for transmitting a first signal;
determining, based on the obtained first TTI, a first transient time associated with the first TTI, the first transient time defining a first duration during which a transmit power level of the wireless device changes;
transmitting the first signal to the network node using the determined first transient time when transmitting the first signal;
obtaining, from the network node, a second TTI for transmitting a second signal, wherein a length of the second TTI is different from a length of the first TTI;
determining, based on the obtained second TTI, a second transient time associated with the second TTI, the second transient time defining a second duration during which the transmit power level of the wireless device changes, wherein the second transient time is different from the first transient time; and
transmitting the second signal to the network node using the determined second transient time when transmitting the second signal,
the first transient time not being part of the first TTI and the second transient time not being part of the second TTI.

2. The method of claim 1, comprising:
determining the first transient time associated with the first TTI based on the length of the first TTI; and
determining the second transient time associated with the second TTI based on the length of the second TTI.

3. The method of claim 1, wherein:
the first transient time associated with the first TTI is a function of one or more of:
the first TTI;
a TTI interval used in an uplink of a serving cell of the wireless device;
a TTI interval used in a downlink of the serving cell of the wireless device;
a type of the first signal;
a number of consecutive uplink TTI's before or after a transient period; and
a number of consecutive downlink TT's before or after the transient period; and
the second transient time associated with the second TTI is a function of one or more of:
the second TTI;
a TTI interval used in an uplink of a serving cell of the wireless device;
a TTI interval used in a downlink of the serving cell of the wireless device;
a type of the second signal;
a number of consecutive uplink TTIs before or after a transient period; and
a number of consecutive downlink TTIs before or after the transient period.

4. The method of claim 1, wherein:
the length of the second TTI is shorter than the length of the first TTI; and
a duration of the first transient time and a duration of the second transient time are linearly scaled with respect to each transient time's associated TTI length according to one or more predefined rules, such that the duration of the second transient time associated with the second TTI is shorter than the duration of the first transient time associated with the first TTI.

5. The method of claim 1, wherein:
the length of the second TTI is shorter than the length of the first TTI; and
a duration of the first transient time and a duration of the second transient time are non-linearly scaled with respect to each transient time's associated TTI length according to one or more predefined rules, such that the duration of the second transient time associated with the second TTI is shorter than the duration of the first transient time associated with the first TTI.

6. The method of claim 1, wherein:
at least one of determining the first transient time associated with the first TTI and determining the second transient time associated with the second TTI is further based on a scaling factor; and
the method comprises receiving the scaling factor from a network node.

7. The method of claim 1, comprising at least one of:
determining the first transient time associated with the first TTI based on whether the length of the first TTI is above a threshold value; and
determining the second transient time associated with the second TTI based on whether the length of the second TTI is above the threshold value.

8. The method of claim 1, wherein at least one of the first TTI and the second TTI is one of:
a shortened TTI;
a transmission time for encoding and interleaving one or more signals;
a slot;
a sub-slot;
a mini-slot; a short subframe; and
a mini-subframe.

9. A method in a network node, comprising:
configuring a wireless device with a first transmission time interval (TTI) for transmitting a first signal;
determining, based on the configured first TTI, a first transient time associated with the first TTI, the first transient time defining a first duration during which a transmit power level of the wireless device changes;
receiving the first signal transmitted by the wireless device using the determined first transient time;
configuring the wireless device with a second TTI for transmitting a second signal, wherein a length of the second TTI is different from a length of the first TTI;
determining, based on the configured second TTI, a second transient time associated with the second TTI, the second transient time defining a second duration during which the transmit power level of the wireless device changes, wherein the second transient time is different from the first transient time; and
receiving the second signal transmitted by the wireless device using the determined second transient time,
the first transient time not being part of the first TTI and the second transient time not being part of the second TTI.

10. The method of claim 9, comprising:
determining the first transient time associated with the first TTI based on the length of the first TTI; and determining the second transient time associated with the second TTI based on the length of the second TTI.

11. The method of claim 9, comprising determining at least one of the first TTI and the second TTI based on one or more of:
a capability of the wireless device;
a required bit rate of the wireless device;
a round trip time required to deliver data between the wireless device and the network node; and
a location of the wireless device.

12. The method of claim 9, wherein:
the length of the second TTI is shorter than the length of the first TTI; and
a duration of the first transient time and a duration of the second transient time are linearly scaled with respect to each transient time's associated TTI length according to one or more predefined rules, such that the duration of the second transient time associated with the second TTI is shorter than the duration of the first transient time associated with the first TTI.

13. The method of claim 9, wherein:
the length of the second TTI is shorter than the length of the first TTI; and
a duration of the first transient time and a duration of the second transient time are non-linearly scaled with respect to each transient time's associated TTI length according to one or more predefined rules, such that the duration of the second transient time associated with the second TTI is shorter than the duration of the first transient time associated with the first TTI.

14. The method of claim 9, wherein:
determining the first transient time associated with the first TTI and determining the second transient time associated with the second TTI are further based on a scaling factor; and
the method comprises sending the scaling factor to the wireless device.

15. A wireless device, comprising:
a receiver;
a transmitter; and
processing circuitry coupled to the receiver and the transmitter, the processing circuitry configured to:
obtain a first transmission time interval (TTI) from a network node for transmitting a first signal;
determine, based on the obtained first TTI, a first transient time associated with the first TTI, the first transient time defining a first duration during which a transmit power level of the wireless device changes;
transmit, via the transmitter, the first signal to the network node using the determined first transient time when transmitting the first signal;
obtain a second TTI from the network node for transmitting a second signal, wherein a length of the second TTI is different from a length of the first TTI;
determine, based on the obtained second TTI, a second transient time associated with the second TTI, the second transient time defining a second duration during which the transmit power level of the wireless device changes, wherein the second transient time is different from the first transient time; and
transmit, via the transmitter, the second signal to the network node using the determined second transient time when transmitting the second signal,
the first transient time not being part of the first TTI and the second transient time not being part of the second TTI.

16. The wireless device of claim 15, wherein the processing circuitry is configured to:
determine the first transient time associated with the first TTI based on the length of the first TTI; and
determine the second transient time associated with the second TTI based on the length of the second TTI.

17. The wireless device of claim 15, wherein:
the length of the second TTI is shorter than the length of the first TTI; and
a duration of the first transient time and a duration of the second transient time are linearly scaled with respect to each transient time's associated TTI length according to one or more predefined rules, such that the duration of the second transient time associated with the second TTI is shorter than the duration of the first transient time associated with the first TTI.

18. The wireless device of claim 15, wherein:
the length of the second TTI is shorter than the length of the first TTI; and
a duration of the first transient time and a duration of the second transient time are non-linearly scaled with respect to each transient time's associated TTI length according to one or more predefined rules, such that the duration of the second transient time associated with the second TTI is shorter than the duration of the first transient time associated with the first TTI.

19. The wireless device of claim 15, wherein:
the processing circuitry is configured to determine at least one of the first transient time associated with the first TTI and the second transient time associated with the second TTI further based on a scaling factor; and
the processing circuitry is configured to receive, via the receiver, the scaling factor from a network node.

20. A network node, comprising:
a receiver;
a transmitter; and
processing circuitry coupled to the receiver and the transmitter, the processing circuitry configured to:
configure a wireless device with a first transmission time interval (TTI) for transmitting a first signal;
determine, based on the configured first TTI, a first transient time associated with the first TTI, the first transient time defining a first duration during which a transmit power level of the wireless device changes;
receive, via the receiver, the first signal transmitted by the wireless device using the determined first transient time;
configure the wireless device with a second TTI for transmitting a second signal, wherein a length of the second TTI is different from a length of the first TTI;
determine, based on the configured second TTI, a second transient time associated with the second TTI, the second transient time defining a second duration during which the transmit power level of the wireless device changes, wherein the second transient time is different from the first transient time; and
receive, via the receiver, the second signal transmitted by the wireless device using the determined second transient time,
the first transient time not being part of the first TTI and the second transient time not being part of the second TTI.

21. The network node of claim 20, wherein the processing circuitry is configured to:
   determine the first transient time associated with the first TTI based on the length of the first TTI; and
   determine the second transient time associated with the second TTI based on the length of the second TTI.

22. The network node of claim 20, wherein:
   the length of the second TTI is shorter than the length of the first TTI; and
   a duration of the first transient time and a duration of the second transient time are linearly scaled with respect to each transient time's associated TTI length according to one or more predefined rules, such that the duration of the second transient time associated with the second TTI is shorter than the duration of the first transient time associated with the first TTI.

23. The network node of claim 20, wherein:
   the length of the second TTI is shorter than the length of the first TTI; and
   a duration of the first transient time and a duration of the second transient time are non-linearly scaled with respect to each transient time's associated TTI length according to one or more predefined rules, such that the duration of the second transient time associated with the second TTI is shorter than the duration of the first transient time associated with the first TTI.

* * * * *